(12) United States Patent　　(10) Patent No.: US 12,223,023 B2
Inoue　　(45) Date of Patent: Feb. 11, 2025

(54) AUTHENTICATION SYSTEM, AUTHENTICATION APPARATUS, AUTHENTICATION METHOD AND COMPUTER PROGRAM

(71) Applicant: NEC Corporation, Tokyo (JP)

(72) Inventor: Junichi Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 292 days.

(21) Appl. No.: 17/637,185

(22) PCT Filed: Jul. 30, 2020

(86) PCT No.: PCT/JP2020/029307
§ 371 (c)(1),
(2) Date: Feb. 22, 2022

(87) PCT Pub. No.: WO2022/024316
PCT Pub. Date: Feb. 3, 2022

(65) Prior Publication Data
US 2022/0327188 A1　　Oct. 13, 2022

(51) Int. Cl.
*G06F 21/32*　　(2013.01)
*G06F 21/31*　　(2013.01)
*G07C 9/37*　　(2020.01)

(52) U.S. Cl.
CPC .............. *G06F 21/32* (2013.01); *G06F 21/31* (2013.01); *G07C 9/37* (2020.01)

(58) Field of Classification Search
CPC ............ G06F 21/31; G06F 21/32; G07C 9/37
See application file for complete search history.

(56) References Cited

U.S. PATENT DOCUMENTS 9,071,602 B2 *　6/2015　Kamakura ............. G06V 10/95
10,956,546 B2 *　3/2021　Lesso ...................... G10L 25/51
11,508,183 B2 * 11/2022　Owaki ................... B60R 25/252
(Continued)

FOREIGN PATENT DOCUMENTS

JP　　2007-206898 A　　8/2007
JP　　2007-249317 A　　9/2007
(Continued)

OTHER PUBLICATIONS

International Search Report for PCT Application No. PCT/JP2020/029307, mailed on Nov. 2, 2020.
(Continued)

*Primary Examiner* — Linglan Edwards

(57) ABSTRACT

An authentication system (10) is provided with: an acquiring means (110) for acquiring a face image of a target (500) passing a gate (200); a face authentication means (120) for performing a face authentication, in which it is determined that whether or not the target is a registered target, by collating information obtained from the face image of the target with information about faces of a plurality of registered targets; and a determining means (130) for determining whether or not the target can pass through the gate on the basis of a number of times of successful authentication when the face authentication is performed a plurality of times. According to such the authentication system, it is possible to properly determine that whether or not a target can pass a gate.

19 Claims, 20 Drawing Sheets

(56) References Cited

U.S. PATENT DOCUMENTS

| | | | |
|---|---|---|---|
| 11,769,362 B2 * | 9/2023 | Kochi | G07C 9/37 382/118 |
| 2008/0080748 A1 | 4/2008 | Sukegawa et al. | |
| 2017/0070501 A1 * | 3/2017 | Saito | G06V 40/161 |
| 2017/0258335 A1 | 9/2017 | Heller | |
| 2017/0372541 A1 * | 12/2017 | Attar | G07C 9/257 |
| 2019/0026449 A1 * | 1/2019 | Richman | G06V 10/235 |
| 2019/0035042 A1 * | 1/2019 | Attar | G07C 9/257 |
| 2019/0057249 A1 | 2/2019 | Hayase et al. | |
| 2019/0071055 A1 * | 3/2019 | Luchner | H04L 63/0861 |
| 2020/0019689 A1 * | 1/2020 | Milgram | G06V 40/16 |
| 2020/0074152 A1 * | 3/2020 | Nakamura | G06V 20/52 |
| 2020/0105080 A1 | 4/2020 | Maeno et al. | |
| 2020/0134154 A1 * | 4/2020 | Cornick | G07C 9/38 |
| 2022/0188954 A1 * | 6/2022 | Callaghan | H04L 9/3231 |

FOREIGN PATENT DOCUMENTS

| | | |
|---|---|---|
| JP | 2008-108243 A | 5/2008 |
| JP | 2010-067008 A | 3/2010 |
| JP | 2010-217999 A | 9/2010 |
| JP | 2012-226598 A | 11/2012 |
| JP | 2013-003817 A | 1/2013 |
| JP | 2014-229015 A | 12/2014 |
| JP | 2016-184197 A | 10/2016 |
| JP | 2017-102684 A | 6/2017 |
| JP | 2020-038545 A | 3/2020 |
| JP | 2020-057191 A | 4/2020 |
| JP | 2020-089592 A | 6/2020 |
| WO | 2017/146161 A1 | 8/2017 |

OTHER PUBLICATIONS

JP Office Action for JP Application No. 2022-539916, mailed on Feb. 20, 2024 with English Translation.

* cited by examiner

First time authentication
Front

Second time authentication
Transverse face (a)

(b)

(a)

(b)

(a)

(b)

(a)

(b)

AUTHENTICATION SYSTEM, AUTHENTICATION APPARATUS, AUTHENTICATION METHOD AND COMPUTER PROGRAM

This application is a National Stage Entry of PCT/JP2020/029307 filed on Jul. 30, 2020, the contents of all of which are incorporated herein by reference, in their entirety.

TECHNICAL FIELD

This disclosure relates to technical fields of an authentication systems, an authentication apparatus, an authentication method and a computer program for person or the like passing through a gate.

BACKGROUND

It is known that a system determining that whether or not a person can pass through a gate by using a face authentication as the system of this kind. For example, Patent Literature 1 discloses a technique extracting feature amount from a face image, and judging a registered person by obtaining a similarity degree of the feature amount. Patent Literature 2 discloses a technique performing an authentication processing by using an average likelihood of accumulated face images. Patent Literature 3 discloses a technique performing an actual authentication after reducing targets to be collated by a pre-authentication.

CITATION LIST

Patent Literature

Patent Literature 1: Japanese Patent Application Laid Open No. 2007-206898
Patent Literature 2: Japanese Patent Application Laid Open No. 2014-229015
Patent Literature 3: Japanese Patent Application Laid Open No. 2020-057191

SUMMARY

Technical Problem

This disclosure aims to improve techniques disclosed in prior art documents described above.

Solution to Problem

One aspect of an authentication system of this disclosure is provided with: an acquiring means for acquiring a face image of a target passing a gate; a face authentication means for performing a face authentication, in which it is determined that whether or not the target is a registered target, by collating information obtained from the face image of the target with information about faces of a plurality of registered targets; and a determining means for determining whether or not the target can pass through the gate on the basis of a number of times of successful authentication when the face authentication is performed a plurality of times.

One aspect of an authentication apparatus of this disclosure is provided with: an acquiring means for acquiring a face image of a target passing a gate; a face authentication means for performing a face authentication, in which it is determined that whether or not the target is a registered target by collating information obtained from the face image of the target with information about faces of a plurality of registered targets; and a determining means for determining whether or not the target can pass through the gate on the basis of a number of times of successful authentication when the face authentication is performed a plurality of times.

One aspect of an authentication method of this disclosure comprises: acquiring a face image of a target passing a gate; performing a face authentication, in which it is determined that whether or not the target is a registered target, by collating information obtained from the face image of the target with information about faces of a plurality of registered targets; and determining whether or not the target can pass through the gate on the basis of a number of times of successful authentication when the face authentication is performed a plurality of times.

One aspect of a computer program of this disclosure causes a computer to: acquiring a face image of a target passing a gate; performing a face authentication, in which it is determined that whether or not the target is a registered target, by collating information obtained from the face image of the target with information about faces of a plurality of registered targets; and determining whether or not the target can pass through the gate on the basis of a number of times of successful authentication when the face authentication is performed a plurality of times.

DESCRIPTION OF EMBODIMENTS

Embodiments of an authentication system, an authentication apparatus, an authentication method and a computer program will be described below referring to drawings.

First Embodiment

An authentication system of a first embodiment will be described with reference to FIGS. 1 to 6.
(Hardware Configuration)

Figure 1:
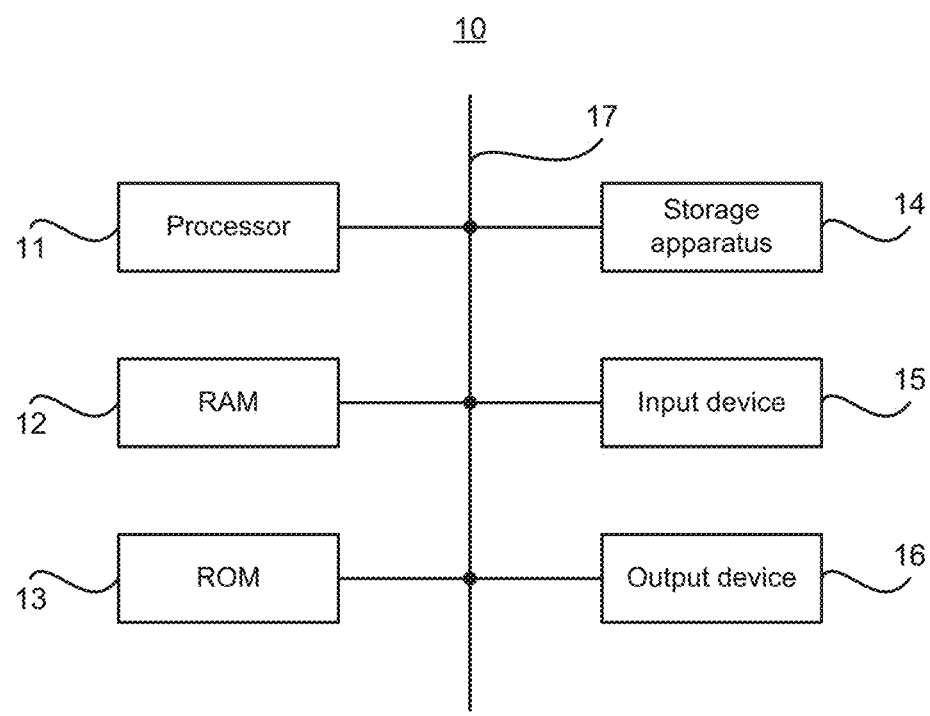
FIG. 1 is a block diagram showing a hardware configuration of an authentication system of a first embodiment.

First, a hardware configuration of the authentication system of the first embodiment will be described with reference to FIG. 1. FIG. 1 is a block diagram showing the hardware configuration of the authentication system of the first embodiment. As shown in FIG. 1, the authentication system 10 of the first embodiment comprises the processor 11, the RAM (Random Access Memory) 12, the ROM (Read Only Memory) 13, and the storage apparatus 14. The authentication system 10 may further comprise the input device 15 and the output device 16. The processor 11, the RAM 12, the ROM 13, the storage apparatus 14, the input device 15 and the output device 16 are connected via the data bus 17.

Processor 11 reads computer programs. For example, the processor 11 is configured to read a computer program stored in at least one of the RAM 12, the ROM 13 and the storage apparatus 14. Alternatively, the processor 11 may read a computer program stored in a computer-readable recording medium by using a recording medium reading apparatus not shown. The processor 11 may acquire (i.e., read) a computer program from an apparatus not shown, which is located outside the authentication system 10, via a network interface. The processor 11 controls the RAM 12, the storage apparatus 14, the input device 15 and the output device 16 by executing the read computer program. In particular, in this embodiment, when the processor 11 executes the read computer program, function blocks for determining whether or not a target can pass through a gate in the processor 11. One of a CPU (Central Processing Unit), GPU (Graphics Processing Unit), FPGA (field-programmable gate array), DSP (Demand-Side Platform) and ASIC (Application Specific Integrated Circuit) may be used as the processor 11, two or more of them may be used in parallel as the processor 11.

The RAM 12 temporarily stores computer programs executed by the processor 11. The RAM 12 temporarily stores data for use by the processor 11 when the processor 11 executes a computer program. The RAM 12 may be, for example, D-RAM (Dynamic RAM).

The ROM 13 stores computer programs executed by the processor 11. The ROM 13 may store other fixed data. The ROM 13 may be, for example, P-ROM (Programmable ROM).

The storage apparatus 14 stores data that the authentication system 10 stores for a long period of time. The storage apparatus 14 may operate as a temporary storage apparatus of the processor 11. The storage apparatus 14 may include, for example, at least one of a hard disk apparatus, a magneto-optical disk apparatus, an SSD (Solid State Drive) and a disk array apparatus.

The input device 15 is a device that receives input instructions from a user of the authentication system 10. The input device 15 may include, for example, at least one of a keyboard, a mouse and a touch panel.

The output device 16 is a device for outputting information about the authentication system 10 to the outside. For example, the output device 16 may be a display apparatus (e.g., a display) capable of displaying information about the authentication system 10.
(Functional Configuration)

Figure 2:
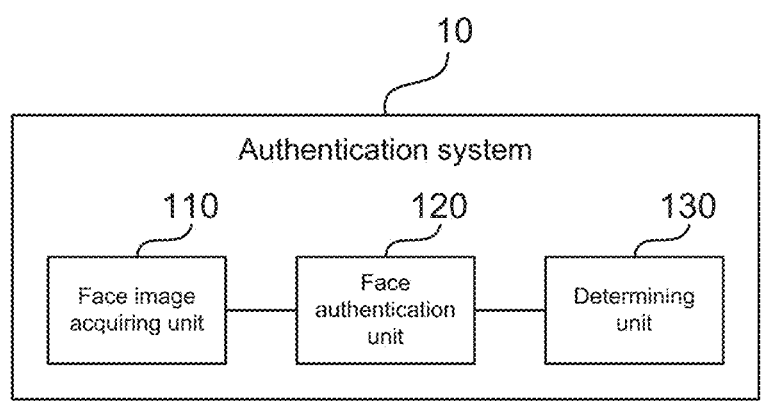
FIG. 2 is a block diagram showing a functional configuration of the authentication system of the first embodiment.

Next, a functional configuration of the authentication system 10 of the first embodiment will be described with reference to FIG. 2. FIG. 2 is a block diagram showing the functional configuration of the authentication system of the first embodiment.

In FIG. 2, the authentication system 10 of the first embodiment is configured as a system for determining that whether or not a target can pass through a gate at a boarding gate in an airport or the like, for example. The following embodiments will be described with reference to a case in which the target is a target person (i.e., human), however, the target may be other than a human (e.g., an animal such as a dog or a cat). The authentication system 10 includes the face image acquiring unit 110, the face authentication unit 120 and the determining unit 130 as processing blocks or as physical processing circuits for realizing its function. The face image acquiring unit 110, the face authentication unit 120 and the determining unit 130 can be realized by, for example, the above-described processor 11 (see FIG. 1).

The face image acquiring unit 110 acquires a face image of a target person who tries to pass through a gate from a camera installed around the gate, for example. Incidentally, the camera may be directly installed in the gate, or the camera may be installed in a place other than the gate around the gate. The face image acquiring unit 110 acquires a face image of the target person imaged by the camera by controlling the camera so as to image a face image at a timing at which the target person reaches a predetermined position (e.g., a position some distance from the gate). Incidentally, a determination criterion for determining whether or not the target person reaches the predetermined position may be any technique for determining whether or not the target person reaches the predetermined position such as a method for analyzing images imaged by a camera (it is determined that the target person reaches the predetermined position when a distance between eyes of the target is equal to or grater than a threshold value), or a method for determining by using a proximity sensor installed in the gate. The face image acquiring unit 110 may be configured to acquire a face image of the target person from one camera, or may be configured to acquire face images of the target person from each of a plurality of cameras. It is configured to output information about images acquired by the face image acquiring unit 110 to the face authentication unit 120.

The face authentication unit 120 is configured to be able to performing the face authentication by using the face image of the target person acquired by the face image acquiring unit 110. Specifically, the face authentication unit 120 performs the face authentication by collating the face image of the target person with face images of the plurality of registered persons (i.e., performing the authentication processing of 1:N). Incidentally, existing techniques may be appropriately adopted to a specific method of the face authentication. A method for extracting a feature amount from a face image and comparing the feature amount is listed as one example. Incidentally, the face authentication unit 120 may have a function for an authentication processing at outside of the system. The face authentication unit 120 may be configured to send information about a face image of a target person to an external server, an external cloud, or the like, and to receive and output a result of an authentication processing executed by a destination apparatus, for example. The system is configured to output an authentication result by the face authentication unit 120 to the determining unit 130.

The determining unit 130 is configured to be able to determine that whether or not a target person can pass through a gate on the basis of an authentication result by the face authentication unit 120. More specifically, the determining unit 130 is configured to be able to determine that whether or not a target person pass through a gate on the basis of the number of successful of the face authentication performed a plurality of times in the face authentication unit 120. Here, the "number of successful" means the number of times determined to be authentication successful when the authentication is performed a plurality of times. The determining unit 130 may control a gate so that a target person can pass it when it is determined that the target person can pass through the gate from the number of successful of the face authentication. On the other hand, the determining unit 130 may control the gate so that the target person cannot pass it when it is determined that the target person cannot pass through the gate from the number of successful of the face authentication.

(Configuration of Gate Apparatus)

Figure 3:
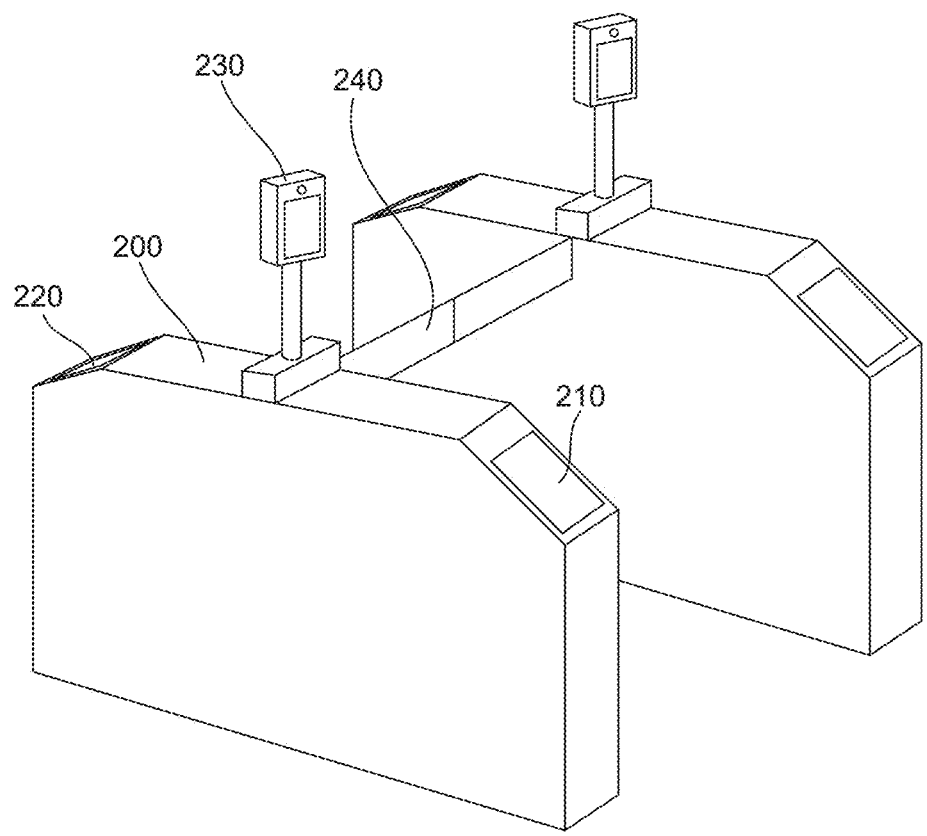
FIG. 3 is a perspective view showing a configuration of a gate apparatus of the first embodiment.

Next, a configuration of the gate apparatus controlled by the authentication system 10 of the first embodiment will be described referring to FIG. 3. FIG. 3 is a perspective view showing the configuration of the gate apparatus of the first embodiment. In the following, a gate apparatus set at a boarding gate in an airport as an example will be described.

As shown in FIG. 3, a plurality of the gate apparatuses 200 are arranged side by side, and a passenger pass between them. The gate apparatus 200 is provided with the read apparatus 210, the display 220 for attendants, the imaging display apparatus 230 and the open/close bar 240.

The read apparatus 210 is located on the entrance side of the gate apparatus 200 (i.e., the side where passengers enter). The read apparatus 210 is configured, for example, to be able to read passport information or ticket information. If it is determined that whether or not a passenger can pass through the gate on the basis of only a result of the face authentication by the face authentication unit 120 (i.e., without confirming a passport, a ticket, or the like), the read apparatus 210 not has to be installed.

The display 220 for attendants is located at the exit of the gate apparatus 200 (i.e., the side where the passenger leaves). The display 220 for attendants is configured to be able to display information of a passenger passing through the gate to an attendant, who guides the passenger on the exit of the gate apparatus 200 (e.g., a ground staff of an airport, etc.). The display 220 for attendants may be configured to be able to read passport information and ticket information such as the read apparatus 210. The display 220 for attendants may display a result of determination of the determining unit 130 (i.e., whether or not a passenger can pass through the gate).

The imaging display apparatus 230 is located on the top of the gate apparatus 200. The imaging display apparatus 230 comprises a camera, which images a face image of a passenger (i.e., a target person) passing through the gate, and a display, which can display various information to the passenger. The system is configured to output face images of target persons imaged by the camera of the imaging display apparatus 230 to the face image acquiring unit 110. Incidentally, two or more cameras for imaging a face image of a target person may be installed in the imaging display apparatus 230 (e.g., two cameras are arranged so as to sandwich the display from above and below, etc.), an additional camera for imaging a face image of a target person may be located at a place that is other than the imaging display apparatus 230. For example, the additional camera may be located on a wall or a ceiling around the gate. The display of the imaging display apparatus 230 may display a result of determination of the determining unit 130 (i.e., whether or not a passenger can pass through the gate).

The open/close bar 240 is located between two gate apparatuses 200. The open/close bar 240 may be configured to close at a normal time, and to open when it is determined that a passenger can pass through the gate by the determining unit 130. Alternatively, the open/close bar 240 may be configured to open at normal time, and to close when it is determined that a passenger cannot pass through the gate by the determining unit 130.

(Flow of Operation)

Figure 4:
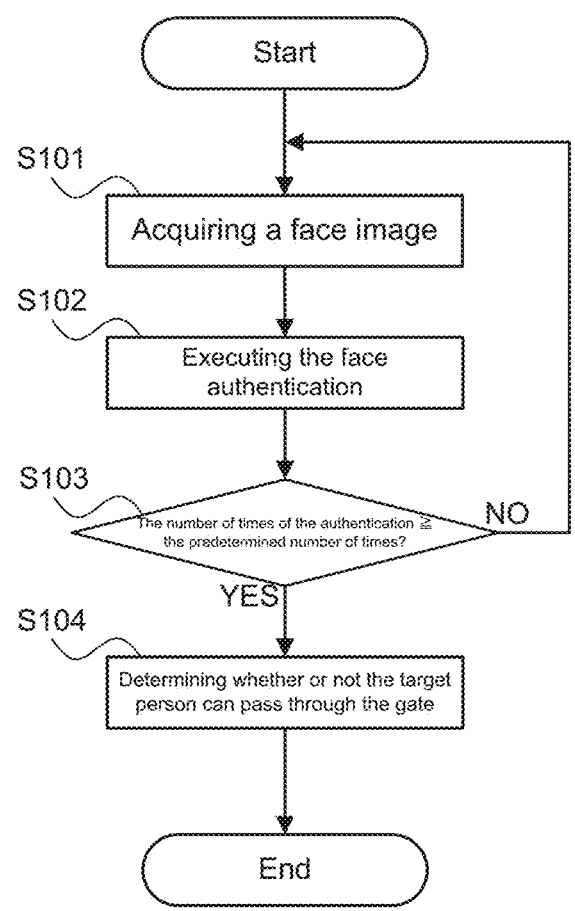
FIG. 4 is a flowchart showing flow of an operation of the authentication system of the first embodiment.

Next, the flow of the operation of the authentication system 10 of the first embodiment will be described referring to FIG. 4. FIG. 4 is the flowchart showing the flow of the operation of the authentication system of the first embodiment.

As shown in FIG. 4, when the authentication system 10 of the first embodiment operates, first, the face image acquiring unit 110 acquires the face image of a target person passing through the gate (step S101). Then, the face authentication unit 120 executes the face authentication by using the information obtained from the face image of the target person (step S102).

Subsequently, the authentication system 10 determines that whether or not the number of face authentication executed by the face authentication unit 120 is equal to or greater than a predetermined value (step S103). Incidentally, the "predetermined value" here is a value that is preset as the number of times of execution of face authentication, and is set at least "2" or more. The predetermined value may be set to the same value as the number of successful of the face authentication that it is determined that a target person can pass through the gate in the determining unit 130. When it is determined that the number of the face authentication executed by the face authentication unit 120 is not equal to or greater than the predetermined value (step S103: NO), processing is repeated from the step S101. As a result, the face authentication is executed a plurality of times by the face authentication unit 120.

On the other hand, when it is determined that the number of the face authentication executed by the face authentication unit 120 is equal to or greater than the predetermined value (step S103: YES), the determining unit 130 determines that whether or not the target person can pass through the gate on the basis of the number of successful of the face authentication executed by the face authentication unit 120 (step S104). Incidentally, as described above, since the face authentication is executed a plurality of times by the face authentication unit 120, when all the face authentications have been successful, the number of successful of the face authentication also becomes a plurality of times. The determining unit 130, for example, may determine that the target person can pass through the gate when the number of successful of face authentication becomes a plurality of times, and may determine that the target person cannot pass through the gate when the number of successful of face authentication is not a plurality of times.

Incidentally, in a situation, in which two persons pass through the gate at the same time such as an adult person holding a small child tries to pass through the gate, or the like, the system may perform the face authentication for two persons at the same time, or may perform the face authentication for only any one of two persons (e.g., only an adult person). When the face authentication is performed for only any one of two persons, the face authentication for the other of two persons, who is not performed the face authentication, (e.g., a small child) may be separately manually performed by a staff or the like. Moreover, when it is determined that one of two persons can pass through the gate, but the other of two persons cannot pass through the gate, the system may instruct re-performing the face authentication for the target person, who cannot pass through the gate, by displaying the face of the target person, who can pass through the gate (or the target person who cannot pass through the gate), on the display 220 for attendants.

(Technical Effects)

Next, technical effects obtained by the authentication system 10 of the first embodiment will be described.

As described referring to FIGS. 1 to 4, in the authentication system 10 of the first embodiment, the face authentication is executed a plurality of times, and it is determined that whether or not a target person can pass through a gate on the basis of the number of successful of the face authentication at that time. In this way, it is possible to more appropriately determine that whether a target person can pass through a gate as compared with a case in which the face authentication is performed only once. In other words, it is possible to determine that whether or not a target person is a registered passenger with high accuracy. Moreover, at a boarding gate in an airport, or the like, it is required that an authentication processing for many target persons is performed accurately. In such a situation, the authentication system 10 of this embodiment exhibits extremely beneficial effects.

Second Embodiment

The authentication system 10 of the second embodiment will be described with reference to FIG. 5. Incidentally, the second embodiment is different from the above mentioned first embodiment in only a part of the operation (specifically, performing a processing for determining that whether or not the number of successful of the face authentication is equal to or greater than a predetermined number of times), the second embodiment may be same as the first embodiment about configurations of the system and the gate (see FIGS. 1 to 3). Therefore, the portions that differ from the first embodiment will be described in detail below, and other overlapping portions will not be appropriately explained.

(Flow of Operation)

Flow of the operation of the authentication system 10 of the second embodiment will be described referring to FIG. 5. FIG. 5 is a flowchart showing the flow of the operation of the authentication system of the second embodiment. Incidentally, in FIG. 5, the same reference numeral is given to a processing which is the same as the processing shown in FIG. 4.

Figure 5:
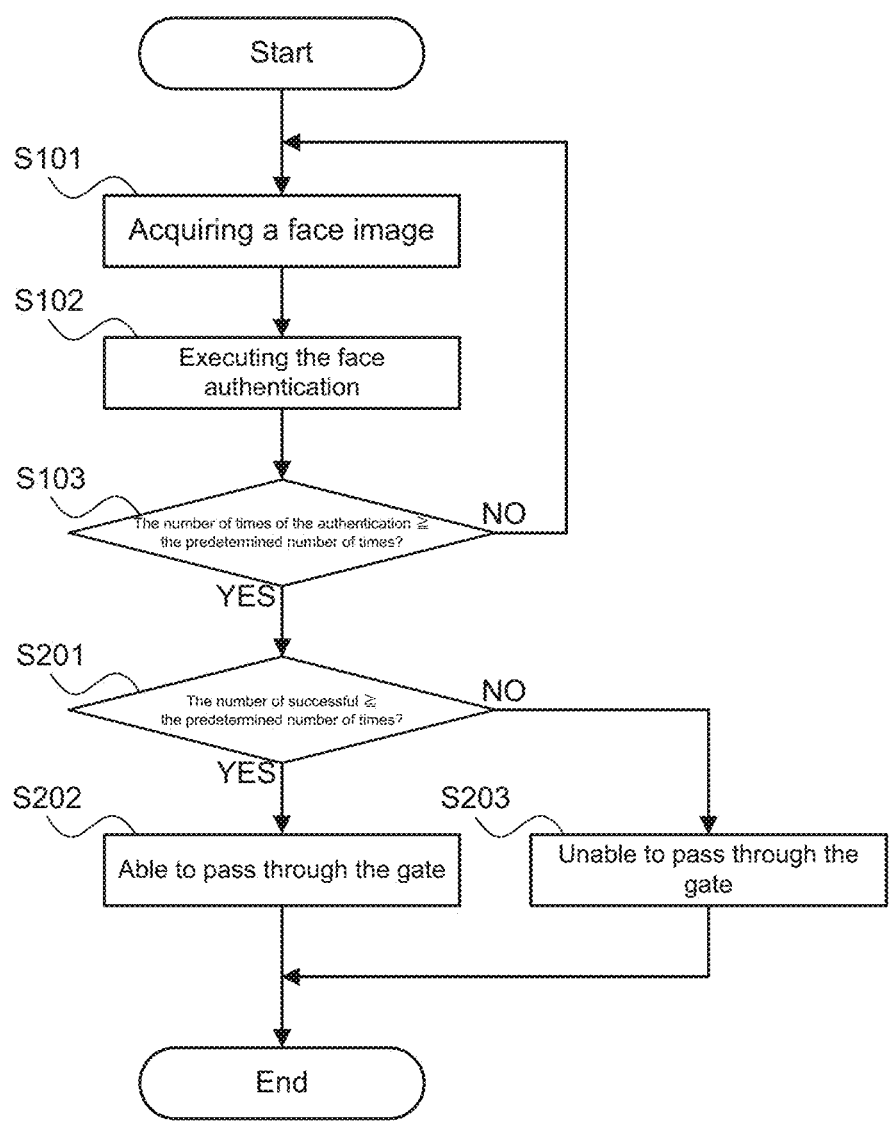
FIG. 5 is a flowchart showing flow of an operation of an authentication system of a second embodiment.

As shown in FIG. 5, when the authentication system 10 of the second embodiment operates, first, the face image acquiring unit 110 acquires the face image of the target person pass through the gate (step S101). Then, the face authentication unit 120 executes the face authentication by using the information obtained from the face image of the target person (step S102).

Subsequently, the authentication system 10 determines that whether or not the number of the face authentication executed by the face authentication unit 120 is equal to or greater than a predetermined value (step S103). When it is determined that the number of the face authentication executed by the face authentication unit 120 is not equal to or greater than the predetermined value (step S103: NO), processing is repeated from the step S101.

On the other hand, when it is determined that the number of the face authentication executed by the face authentication unit 120 is equal to or greater than the predetermined value (step S103: YES), the determining unit 130 determines that whether or not the number of successful of the face authentication executed by the face authentication unit 120 is equal to or greater than the predetermined number of times (step S201). Here, the "predetermined number of times" is a threshold value for determining that whether or not a target person can pass through the gate, and is set in advance. The predetermined number of times can be set as an arbitrary value, but it is required to set as a value equal to or less than the predetermined value of the step S103 (i.e., the number of times of the face authentication is executed).

When it is determined that the number of successful of the face authentication executed by the face authentication unit 120 is equal to or greater than the predetermined number of times (step S201: YES), the determining unit 130 determines that the target person can pass through the gate (step S202). On the other hand, when it is determined that the number of successful of the face authentication executed by the face authentication unit 120 is not equal to and greater than the predetermined number of times (step S201: NO), the determining unit 130 determines that the target person cannot pass through the gate (step S203).

Incidentally, the determining processing of the step S201 may be executed in parallel in the loop from the processing of the step S101 to the processing of the step S103 (i.e., may be executed before at time, in which the number of executions of the face authentication reaches the predetermined value). In this case, even if the number of executions of the face authentication does not reach the predetermined value, it may be determined that a target person can pass through the gate at a time point, in which the number of successful of the face authentication is equal to or greater than the predetermined number of times. For example, it is suppose that the predetermined value of the step S103 is "5", and the predetermined number of times of the step S201 is "2". If both of the first two face authentication are successful, it may be determined that a target person can pass through the gate at that time (i.e., the face authentication is not executed five times).

The predetermined number of times of the step S201 may be set as a value, which corresponds to the number of continuous successful. In this case, even if the cumulative number of successful is equal to or greater than the predetermined number of times, it is determined that a target person cannot pass through the gate when the number of continuous successful is not equal to and greater than the predetermined number of times. For example, it is suppose that the predetermined value of the step S103 is "5", and the predetermined number of times of the step S201 is "2", similarly to the case described above. When the result of the face authentication is "○, X, ○, X, ○" in order (○ is successful, X fails), it is determined that a target person cannot pass through the gate. This is because, the cumulative number of successful is three, but the number of continuous successful is only one. On the other hand, when the result of the face authentication is "X, X, X, ○, ○" in order, it is determined that a target person can pass through the gate.

This is because, the authentication continuously failed in the first three times, but the authentication continuously succeeded in the last two times.

Alternatively, a condition, in which the predetermined number of times (i.e., the cumulative number of successful), and the number of continuous successful are different from each other, may be set. For example, it is suppose that the predetermined number of times is "3", and the number of continuous successful is "2". In this case, if the result of the face authentication is "X, ◯, X, ◯, X" in order, it is determined that a target person cannot pass through the gate. This is because the cumulative number of successful is only two and the number of continuous successful is only one. On the other hand, if the result of the face authentication is "◯, X, ◯, X, ◯" in order, it is determined a target person can pass through the gate. This is because the cumulative number of successful is three, although the number of continuous successful is only one. Moreover, if the result of the face recognition is "◯, ◯, X, X, and X" in order, it is determined that a target person can pass through the gate. This is because, although the cumulative number of successful is only two, the number of continuous successful is two.

Further, when face images are imaged by a plurality of cameras, the predetermined number of times and the number of continuous successful described above may be set for each camera. In this case, the number of successful of the face authentication is counted for each camera, and it is determined for each camera that whether or not a target person can pass through the gate. For example, it is suppose that in a first camera, the predetermined number of times is "3" and the number of continuous successful is "2"; in a second camera, the predetermined number of time is "5" and the number of continuous successful is "3". Here, if the cumulative number of successful of the face authentication is four by using images of the first camera, it is determined that a target person can pass through the gate even if the cumulative number of successful is only one in the face authentication by using images of the second camera. Further, if the cumulative number of successful is three in the face authentication by using images of the second camera, it is determined that a target person can pass through the gate even if the number of continuous successful is one in the face authentication by using images of the first camera.

(Technical Effects)

Next, technical effects obtained by the authentication system 10 of the second embodiment will be described.

As described referring to FIG. 5, in the authentication system 10 of the second embodiment, it is determined that a target person can pass through the gate when the number of successful of the face authentication is equal to or greater than the predetermined number of times. Therefore, it is possible to appropriately determine that whether or not a target person can pass through the gate by setting the predetermined number of times as an appropriate value. For example, if the predetermined number of times is set to a relatively small value (e.g., "2"), it is possible to prevent that it is determined that a target person, who can pass through the gate, cannot pass through the gate by mistake, while collating the target person with high accuracy in the face authentication executed a plurality of times. On the other hand, if the predetermined number of times is set to a relatively large value (e.g., "5"), it is possible to prevent that it is determined that a target person, who cannot pass originally, can pass by mistake.

Third Embodiment

The authentication system 10 of the third embodiment will be described with reference to FIGS. 6 and 7. the third embodiment is different from the above mentioned first and second embodiments in only a part of the operation and the configuration, the third embodiment may be same as the first embodiment about configurations of the system and the gate (see FIGS. 1 to 3). Therefore, in the following, portions, that differ from portions described already, will be described in detail, and it is intended to omit the description as appropriate for other overlapping portions.

(Functional Configuration)

First, referring to FIG. 6, a description will be given of the functional configuration of the authentication system 10 according to the third embodiment. FIG. 6 is a block diagram showing the functional configuration of the authentication system of the third embodiment. Incidentally, in FIG. 6, the same reference numeral is given to a element which is the same as the component shown in FIG. 2.

Figure 6:
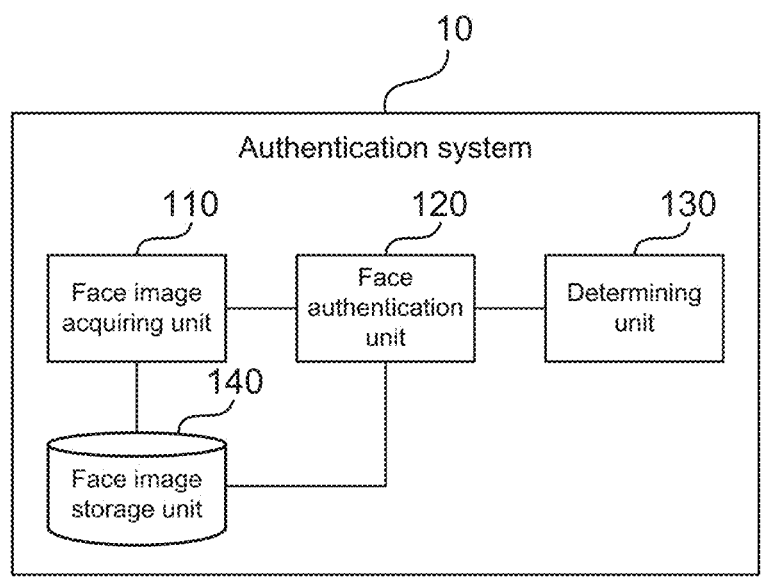
FIG. 6 is a block diagram showing a functional configuration of an authentication system of a third embodiment.

In FIG. 6, the authentication system 10 of the third embodiment comprises the face image acquiring unit 110, the face authentication unit 120, the determining unit 130 and the face image storage unit 140 as processing blocks or as physical processing circuits for realizing its function. The face image storage unit 140 can be realized by the above-described storage apparatus 14 (see FIG. 1), for example.

The face image storage unit 140 is configured to be able to store face images acquired by the face image acquiring unit 110 (i.e., face images of target persons imaged by a camera). The face image storage unit 140 accumulates about ten face images of a target person passing through the gate, for example. When the determination of whether the target person can pass through the gate is completed, the face image storage unit 140 may delete accumulated face images of the target person. The system is configured to appropriately output face images of target persons accumulated in the face image storage unit 140 to the face authentication unit 120.

The face authentication unit 120 of the third embodiment is configured to be able to execute the face authentication by selecting a image, which is suitable for the face authentication, from face images of a target person accumulating the face image storage unit 140. The face authentication unit 120 may select following images as the image, which is suitable for the face authentication: an image, in which a target person is facing the front, an image, in which the distance between eyes of a face image is equal to or greater than a certain value, an image, in which a face of a target person is not missing, an image, in which a face of a target person is not shaken, an image, in which a face of a target person is not blurred, an image, of which resolution is larger than a predetermined value (when a plurality of cameras having different resolutions are used), or the like, for example.

(Flow of Operation)

Flow of the operation of the authentication system 10 of the third embodiment will be described referring to FIG. 7. FIG. 7 is a flowchart showing the flow of the operation of the authentication system of the third embodiment. Incidentally, in FIG. 7, the same reference numeral is given to processing which is the same as the processing shown in FIGS. 4 and 5.

Figure 7:
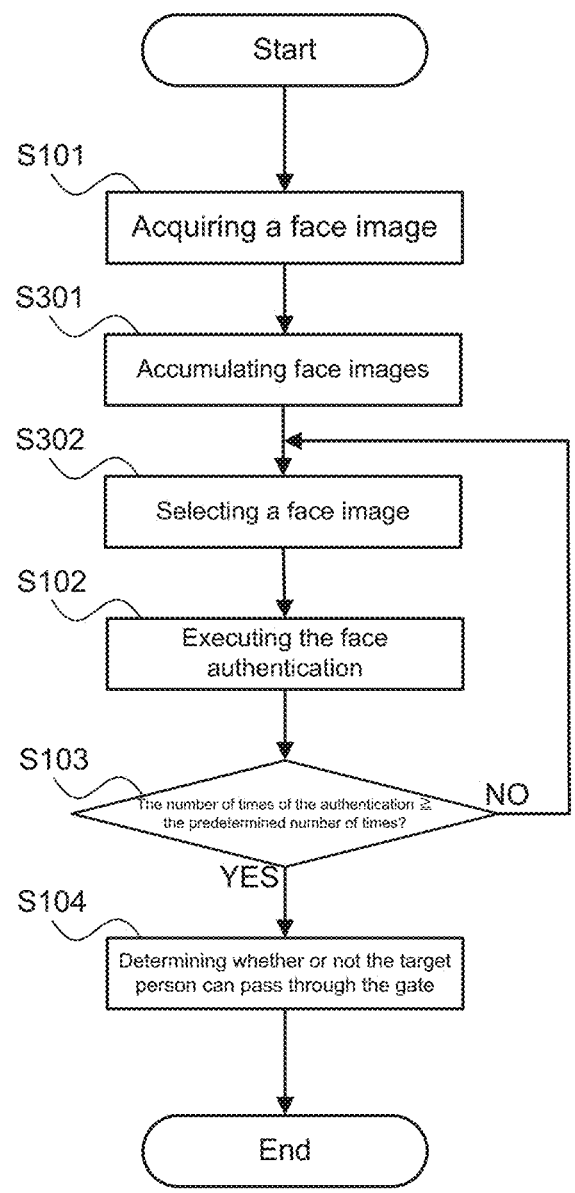
FIG. 7 is a flowchart showing the flow of the operation of the authentication system according to the third embodiment.

As shown in FIG. 7, when the authentication system 10 of the third embodiment operates, first, the face image acquiring unit 110 acquires face images of a target person passing through the gate (step S101). In the third embodiment, in particular, the face image storage unit 140 accumulates face images of a target person acquired by the face image acquiring unit 110 (step S301). Although not shown in detail in the flowchart, the accumulation of face images by the face image storage unit 140 is continuously performed until accumulated face images reach a predetermined number or until a predetermined period has elapsed, for example. That is, the processing of the step S101 to the processing of the step S103 are executed so as to be looped a plurality of times.

Subsequently, the face authentication unit 120 selects a face image, which is suitable for the face authentication, from a plurality of face images accumulated in the face image storage unit 140 (step S302). Then, the face authentication unit 120 executes the face authentication by using information obtained from the selected face image (step S102).

Subsequently, the authentication system 10 determines that whether or not the number of the face authentication executed by the face authentication unit 120 is equal to or greater than the predetermined value (step S103). When it is determined that the number of the face authentication executed by the face authentication unit 120 is not equal to and greater than the predetermined value (step S103: NO), processing is repeated from the step S101. On the other hand, when it is determined that the number of the face authentication executed by the face authentication unit 120 is equal to or greater than the predetermined value (step S103: YES), the determining unit 130 determines whether or not the target person can pass through the gate on the basis of the number of successful of the face authentication executed by the face authentication unit 120 (step S104).

(Technical Effects)

Next, technical effects obtained by the authentication system 10 of the third embodiment will be described.

As described referring to FIGS. 6 and 7, in the authentication system 10 of the third embodiment, face images of target persons are accumulated, and the face authentication is performed by using a face image selected from them. In this way, since the face authentication can be performed with an image which is suitable for the face recognition, it is possible to improve the accuracy of the face recognition. In addition, the face authentication may require a predetermined interval (e.g., 250 ms) between a request of processing once and the request of the next processing or between the execution of processing once and the execution of the next processing so that processing is not saturated. In this case, if the accumulation of face images by the face image storage unit 140 is performed in a period corresponding to the predetermined interval described above, the face authentication can be performed without decreasing the throughput. Such technical effects are significantly demonstrated when many target person authentication processing are required to be performed in a short time, e.g., in airplane boarding gates.

Fourth Embodiment

The authentication system 10 of the fourth embodiment will be described referring to FIG. 8. Incidentally, the fourth embodiment is different from respective embodiments described above only portions relating to the camera control. The fourth embodiment may be the same as embodiments already described for other configurations and flow of the operation.

Therefore, in the following, portions, which differ from portions already described, will be described in detail, it is intended to omit the description as appropriate for other overlapping portions.

(Camera Position Control)

A camera position control of the authentication system 10 of the fourth embodiment will be described referring to FIG. 8. FIG. 8 is a conceptual diagram showing a movement aspect of the camera in the authentication system of the fourth embodiment. Incidentally, In FIG. 8, the same reference numeral is given to a configuration, which is the same as the configuration shown in FIG. 3.

Figure 8:
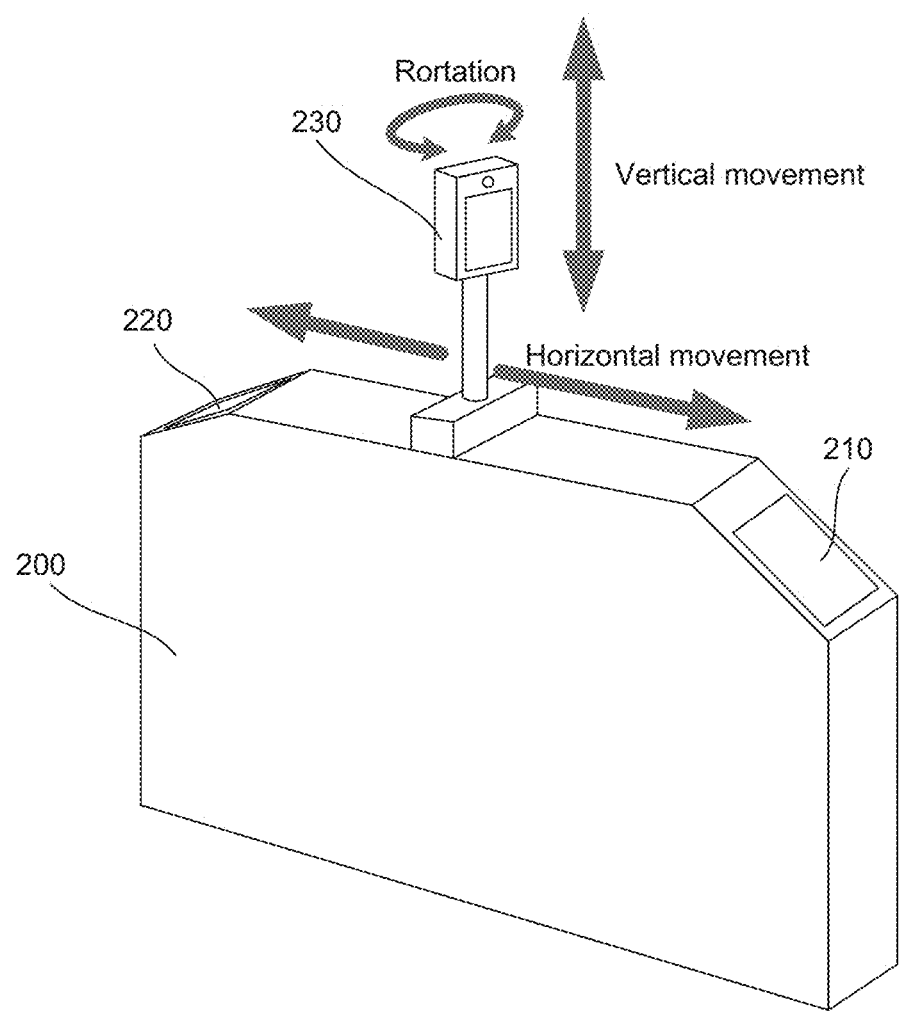
FIG. 8 is a conceptual diagram showing a movement aspect of a camera in an authentication system of a fourth embodiment.

As shown in FIG. 8, the authentication system 10 of the fourth embodiment is configured to be able to changing the position of the camera for imaging face images of target persons. More specifically, the imaging display unit 230 having the camera is configured to be able to move on the gate apparatus. Incidentally, in the following, movement of the imaging display unit 230 will be described specifically. If a camera is installed other than the imaging display unit 230, it may be configured to be able to change its position similarly.

The imaging display unit 230 may be vertically movable so that its height is changed. The imaging display unit 230 may be configured to move vertically by expanding and contracting its strut, for example. The imaging display unit 230 is moved vertically so that the height of the camera becomes the height of the face of a target person, for example. In this case, the position of the face of the target person is detected by a sensor or the like, then, the imaging display unit 230 may be moved vertically according to the height of the face of the target person.

The imaging display unit 230 may be laterally movable so as to change its horizontal position. The imaging display unit 230 may be configured to move laterally by moving horizontally on the gate apparatus 200, for example. The imaging display unit 230 is moved laterally so that the camera follows a target person passing through the gate, for example.

In this case, the position of the target person is detected by a sensor or the like, then, the imaging display unit 230 may be moved laterally according to the traveling direction.

The imaging display unit 230 may be rotatable so that the direction of the horizontal direction is changed. The imaging display unit 230 may be configured to rotate together by rotating its strut, for example. The imaging display unit 230 may be configured to rotate so that the camera follows a target person passing through the gate, for example. In this case, the position of the target person is detected by a sensor or the like, then, the imaging display unit 230 may be rotated toward to the traveling direction.

The imaging display unit 230 may be configured to able to realize combination vertical moving, laterally moving and rotation, each of which is described above. Incidentally, the above-described movement aspect is an example only, the imaging display unit 230 may be configured to be able to move in other directions.

When moving the camera, images are more likely to be shaken than when fixing the camera. The shutter speed may be increased in order to suppress this shake, for example. When the shutter speed is increased, since brightness of images become low, light may be irradiated to a target person, or lighting intensity may be changed. When a target person faces toward the camera, it is likely that the target person does not know a direction, in which the target person turns his/her face, due to moving the camera. In this case, the position of the camera may be announced to the target person by displaying an image, which is currently imaged, on the imaging display unit 230, for example. Further, it is provided with a speaker to the imaging display unit 230, let the target person turn his/her face to the camera by outputting sound in accordance with movement or imaging timing of the camera. Incidentally, the speaker may be installed in other than the imaging display unit 230 (e.g., near the gate or the gate apparatus 200 itself, etc.) as long as in range where the sound reaches a target person.

Further, when the camera is moved, for example, a person other than a target person (e.g., a passenger passing the neighboring gate) may be included in an image due to changing the imaging range greatly. However, in the authentication system 10 of this embodiment, as already described, it is determined that the target person can pass through the gate after a plurality of face authentication is executed. Therefore, even when another person is included in an image, it is possible to suppress occurrence of erroneous authentication in comparison with a case in which the face authentication is performed only once.

(Technical Effects)

Next, technical effects obtained by the authentication system 10 of the fourth embodiment will be described.

As described referring to FIGS. 6 and 7, in the authentication system 10 of the fourth embodiment, the position of the camera can be moved. Therefore, it is possible to image face images of target person more adequate. For example, it is possible to image so that the face of a target person is reliably included in the imaging range. In addition, it is possible to image a target person from different angles. As a consequence, it is possible to properly perform the face authentication by using face images of target persons.

Fifth Embodiment

The authentication system 10 of the fifth embodiment will be described referring to FIG. 9. Incidentally, the fifth embodiment is different from respective embodiments described above in portions of the operation (particularly, the operation relating to the face authentication). For example, the system configuration and flow of the overall operation of the fifth embodiment may be the same as embodiments already described. Therefore, in the following, portions, that differ from portions already described, will be described in detail, it is intended to omit the description as appropriate for other overlapping portions.

(Face Authentication by Front and Lateral Faces)

The face authentication of the authentication system 20 of the fifth embodiment will be described referring to FIG. 9. FIG. 9 is a diagram showing two face images used in the authentication system of the fifth embodiment.

Figure 9:
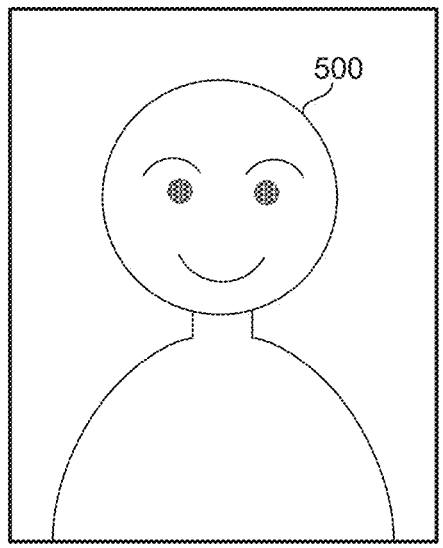
FIG. 9 is a diagram showing two face images used in an authentication system of a fifth embodiment.
Figure 9:
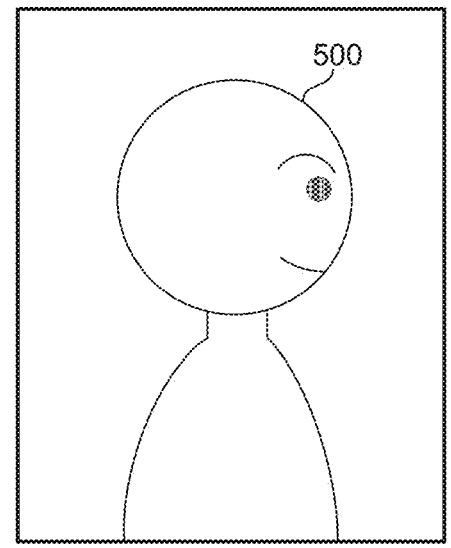

As shown in FIG. 9, the authentication system 10 of the fifth embodiment uses an image, in which the target person 500 is imaged from the front, for the first face authentication. Then, it uses an image, in which the transverse face of the target person 500 is imaged, for the second face authentication. In other words, in the face authentication of the fifth embodiment, face images of the target person 500 that imaged from different angles are used in each of a plurality of times of the face authentication. In this case, registered images for using the face authentication are preferably images imaged from different angles. Alternatively, information representing a face three-dimensionally, for example 3D model, may be used instead of registered images. Incidentally, "front" and "transverse face" shown in figure are only examples, face images imaged from other angles may be used.

Face images of different angles can be imaged by moving the position of the camera, for example, as described in the fourth embodiment. For example, a face image of the front of the target person 500 can be imaged if the camera is directed toward the entrance of the gate at the timing when the target person 500 is approaching the gate. Also, the transverse face of the target person 500 can be imaged if the camera is faced inside the gate at the timing when the target person 500 passes the gate.

Alternatively, face images can be imaged from different angles without moving the position of the camera. For example, when the target person 500 moves, the relative position between the camera and the target person 500 changes. Therefore, by imaging a plurality of face images at different timings while the target person 500 is moving, it is possible image face images of the target person 500 from different angles. Further, it is possible to image face images from different angles by using a plurality of cameras. For example, if the target person 500 are imaged by the camera installed on the gate apparatus 200 and the camera installed on a wall or ceiling around the gate, it is possible to image face images of the target person 500 from different angles.

(Technical Effects)

Next, technical effects obtained by the authentication system 100 of the fifth embodiment will be described.

As described referring to FIG. 9, in the authentication system 10 of the fifth embodiment, the face authentication is performed by using face images imaged from different angles. In this way, since face images imaged from a plurality of angles can be used, it is possible to increase the accuracy of the face authentication in comparison with a case in which a face image imaged from one direction are only used.

Sixth Embodiment

The authentication system 10 of the sixth embodiment will be described referring to FIGS. 10 and 11. The sixth embodiment describes specific display examples in the imaging display unit 230. The configuration and flow of the operation of the sixth embodiment may be the same as embodiments already described. Therefore, in the following, portions, that differ from portions already described, will be described in detail, it is intended to omit the description as appropriate for other overlapping portions.

(Display Examples of the Imaging Display Unit)

Display examples in the authentication system 10 of the sixth embodiment will be described referring to FIGS. 10 and 11. FIG. 10 is a diagram (Part 1) showing a display example by the authentication system of the sixth embodiment. FIG. 11 is a diagram (Part 2) showing a display example by the authentication system according to the sixth embodiment.

Figure 10:
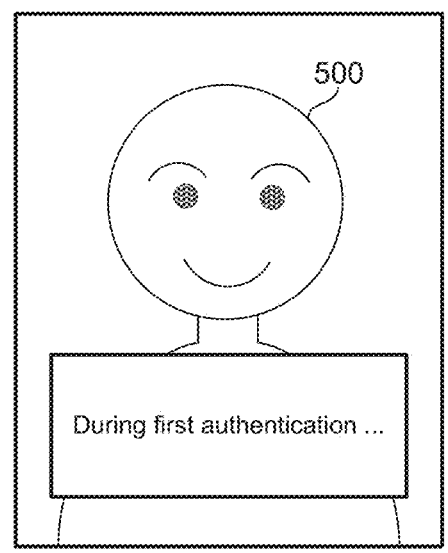
FIG. 10 is a diagram (part 1) showing a display example by an authentication system of a sixth embodiment.
Figure 10:
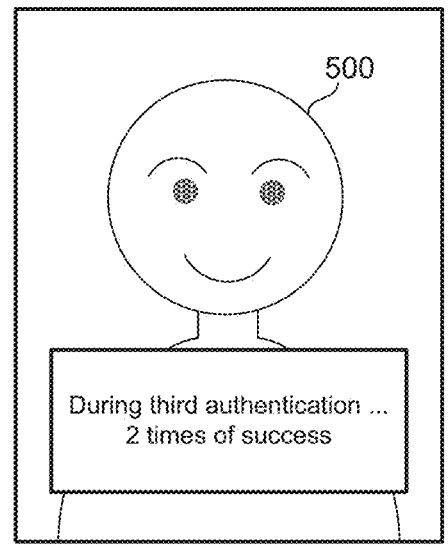

As shown in FIG. 10(*a*), in the authentication system 10 of the sixth embodiment, information indicating how many times the face authentication processing being executed may be displayed together with the face image (i.e., an image used for the face authentication) of the target person 500. In the example shown in the figure, the text "During first authentication . . . " is displayed on the face image of the target person 500. This indicates that the face authentication currently being performed is the first of the face authentication performed multiple times.

As shown in FIG. 10(*b*), in the authentication system 10 of the sixth embodiment, information indicating how many times the face authentication processing being executed and information indicating the number of times the face authentication has been successful may be displayed together with the face image of the target person 500. In the example shown in the figure, the text "During third authentication . . . " and "2 times of success" are displayed on the face image of the target person 500. This indicates that the face authentication currently being executed is the third of the face authentication performed multiple times, and that two of the past two face authentications have been successful (in other words, the past two face authentications are not failure). the number of successful and the number of failures may be displayed as an icon or an image instead of a text. For example, "◯" may be displayed if the face authentication is successful, and "X" may be displayed if the face authentication is failure. In this case, if first and second are failure, and if third and fourth are successful, it may be displayed as "X X X ◯◯".

Figure 11:
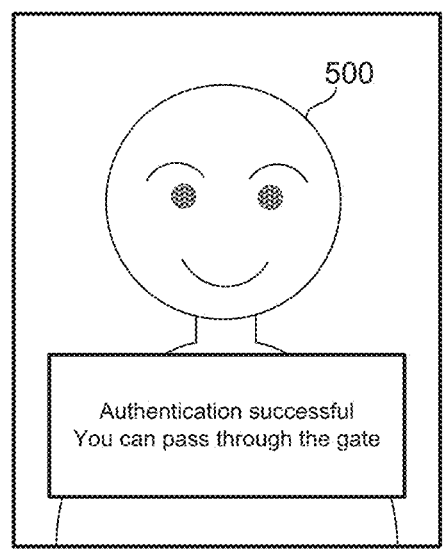
FIG. 11 is a diagram (part 2) showing a display example by the authentication system of the sixth embodiment.
Figure 11:
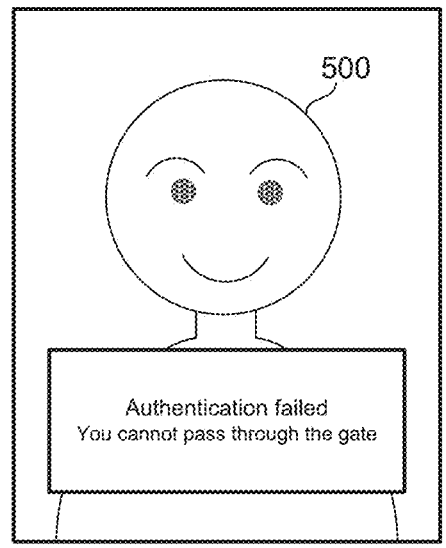

As shown in FIG. 11, in the authentication system 10 of the sixth embodiment, information indicating a result of the determination that whether or not a target person can pass through the gate may be displayed together with the face image of target person 500. In the example shown in FIG. 11(a), the text "authentication successful" and the text "you can pass through the gate" are displayed on the facial image of target person 500. This indicates that the face authentication was successful more than a predetermined number of times, and it is determined that the target person 500 can pass through the gates. On the other hand, in the example shown in FIG. 11(b), the text "authentication failed" and the text "you cannot pass through the gate" are displayed on the face image of target person 500. This indicates that the number of successful of the face authentication does not reach a predetermined number of times, and it is determined that the target person 500 cannot pass through the gate.

Display examples described above are merely examples, in addition to or in place of the above information, other information handled by the authentication system 10 may be displayed. Although display examples described above are assumed to be displayed on the display of the imaging display apparatus 230, display examples may be displayed on a display unit other than the imaging display apparatus 230 (for example, the display 220 for attendants or the like).
(Technical Effects)

Next, technical effects obtained by the authentication system 10 of the sixth embodiment will be described.

As described referring to FIGS. 10 and 11, in the authentication system 10 of the sixth embodiment, an image used for the face authentication and various information relating to the face authentication are displayed on the display of the imaging display apparatus 230. In this way, it is possible to appropriately display the progress status of the face authentication and the determination result to the target person 500.

Seventh Embodiment

The authentication system 10 of the seventh embodiment will be described referring to FIGS. 12 to 15. The seventh embodiment is different from respective embodiments describe above in portions of configuration and operation. The seventh embodiment may be the same as the hardware configuration and the gate configuration of embodiments already described.
Therefore, in the following, portions, differ from portions already described, will be described in detail, it is intended to omit the description as appropriate for other overlapping portions.
(Functional Configuration)

Figure 12:
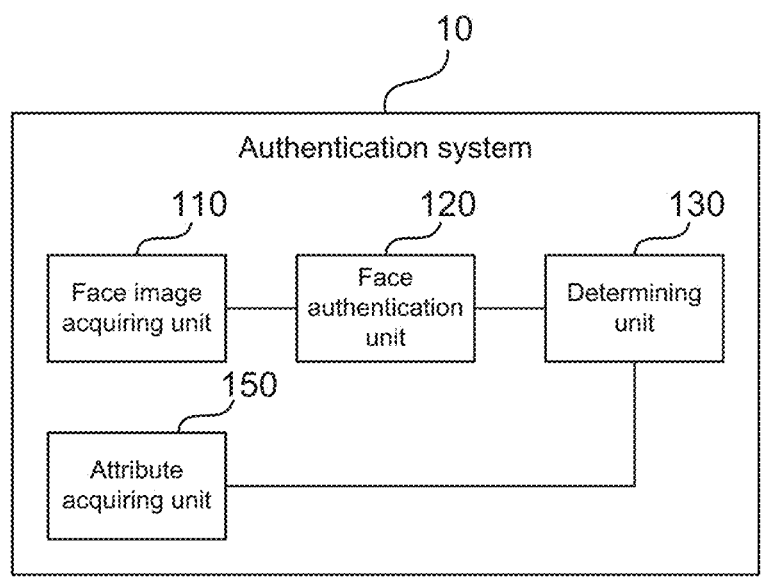
FIG. 12 is a block diagram showing a functional configuration of an authentication system of a seventh embodiment.

First, a functional configuration of the authentication system 10 of the seventh embodiment will be described referring to FIG. 12. FIG. 12 is a block diagram showing the functional configuration of the authentication system of the seventh embodiment. Incidentally, in FIG. 12, the same reference numeral is given to an element, which is the same as the component shown in FIGS. 2 and 6.

As shown in FIG. 12, the authentication system 10 of the seventh embodiment comprises the face image acquiring unit 110, the face authentication unit 120, the determining unit 130 and the attribute acquiring unit 150 as processing blocks or physical processing circuits for realizing its function. In other words, the authentication system 10 of the seventh embodiment is configured to further comprising the attribute acquiring unit 150 in addition to the components of the first embodiment (see FIG. 2). The attribute acquiring unit 150 may be realized by the above-described processor 11, for example (see FIG. 1).

The attribute acquiring unit 150 is configured to be able to acquire information relating to the attribute of the target person 500 pass through the gate (hereinafter, appropriately referred to as "attribute information"). The "attribution information" here is information belonging to personal of the target person. For example, name, age, gender, occupation, etc., and information related to boarding are listed as the information. Information on a boarding gate number, a flight name, a seat of an airplane, on which the target person boards, a status rank, which is determined by the airline used by the target person, of the target person, or the like are listed as examples of the information related to boarding. The attribution information may include information about a traveling companion of the target person instead of the target person itself.

The attribute acquiring unit 150 may acquire the attribute information from the registration information associated with the passport or ticket of the target person 500. Alternatively, the attribute acquiring unit 150 may acquire the attribute information from the registration information associated with the result of the face authentication of the face authentication unit 120. The attribute acquiring unit 150 may acquire the attribute information by estimating the attribute information from the face image of the target person 500 (e.g., estimating gender, age, or the like). The system is configured to output the attribute information acquired by the attribute acquiring unit 150 the determining unit 130.
(Flow of Operation)

Figure 13:
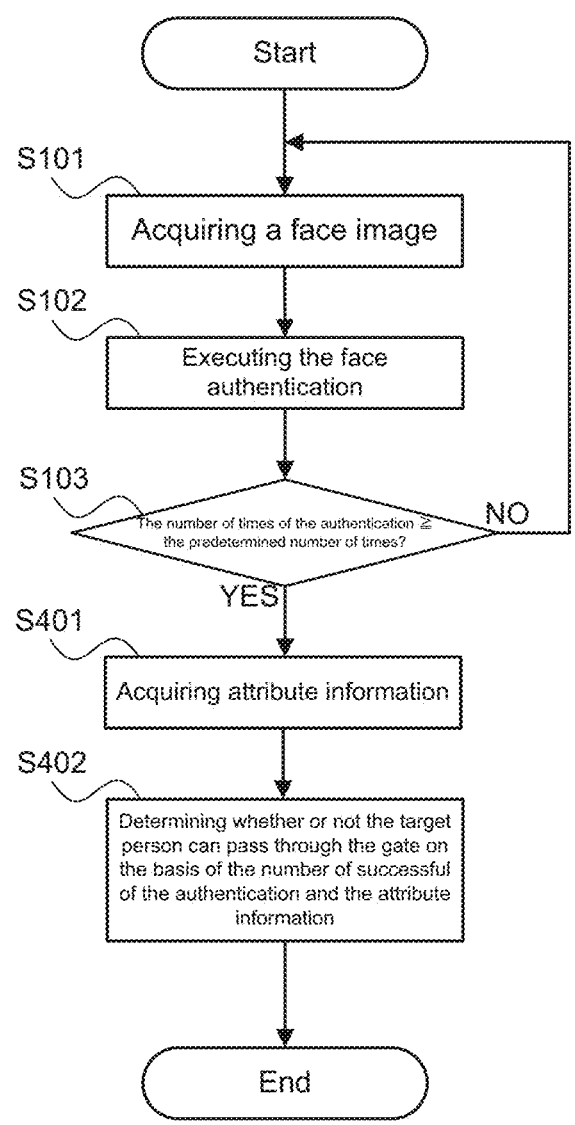
FIG. 13 is a flowchart showing flow of an operation of the authentication system of the seventh embodiment.

Next, flow of the operation of the authentication system 10 of the seventh embodiment will be described referring to FIG. 13. FIG. 13 is a flowchart showing the flow of the operation of the authentication system of the seventh embodiment. In FIG. 13, the same reference numeral is given to processing which is the same as the processing shown in FIGS. 4, 5 and 7.

As shown in FIG. 13, when the authentication system 10 of the seventh embodiment operates, first, the face image acquiring unit 110 acquires the face image of the target person pass through the gate (step S101). Then, the face authentication unit 120 executes the face authentication by using the information obtained from the face image of the target person (step S102).

Subsequently, the authentication system 10 determines that whether or not the number of the face authentication executed by the face authentication unit 120 is equal to or greater than the predetermined value (step S103). When it is determined that the number of the face authentication executed by the face authentication unit 120 is not equal to and greater than the predetermined value (step S103: NO), processing is repeated from the step S101.

On the other hand, when it is determined that the number of the face authentication executed by the face authentication unit 120 is equal to or greater than the predetermined value (step S103: YES), the attribute acquiring unit 150 acquires the attribute information of the target person 500 (step S401). Incidentally, the attribute acquiring unit 150 may acquire the attribute information in parallel with processing of the step S101 to the step S103 described above.

Thereafter, the determining unit 130 determines that whether or not the target person 500 can pass through the gate on the basis of the number of successful of the face authentication executed by the face authentication unit 120 and the attribute information of the target person 500 (step S402). For example, the determining unit 130 may determine that the target person 500 can pass through the gate when a condition relating to the attribute information, in addition to a condition relating to the number of successful of the face authentication are satisfied. The determining unit 130 may determine that the target person 500 cannot pass through the gate when the condition relating to the number of successful of the face authentication or the condition relating to the attribute information is not satisfied.

Further, the determining unit 130 may change the condition relating to the number of successful of the face authentication (e.g., the predetermined number of times in the step S201 of FIG. 5) on the basis of the attribute information. If it is changed so that the predetermined number of times increases according to the attribute information, for example, the target person 500 is likely to be determined unable to pass through the gate. On the other hand, if it is changed so that the predetermined number of times decreases according to the attribute information, the target person 500 is likely to be determined able to pass through the gate.

(Usage Examples of Attribute Information)

Figure 14:
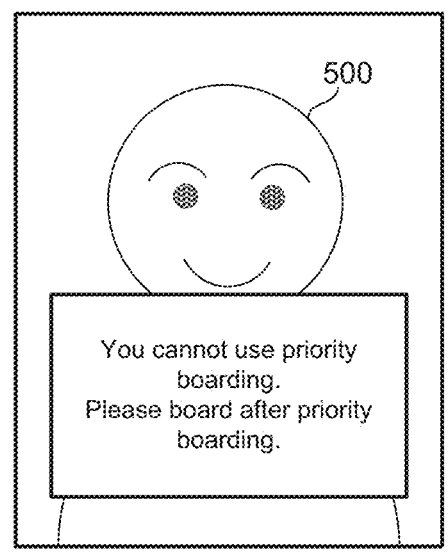
FIG. 14 is a diagram showing a display example by the authentication system of the seventh embodiment.
Figure 14:
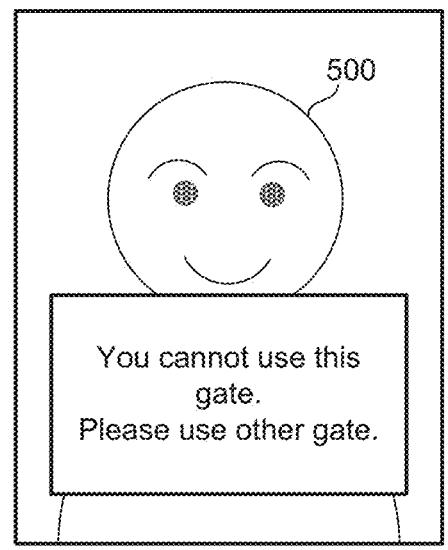
Figure 15:
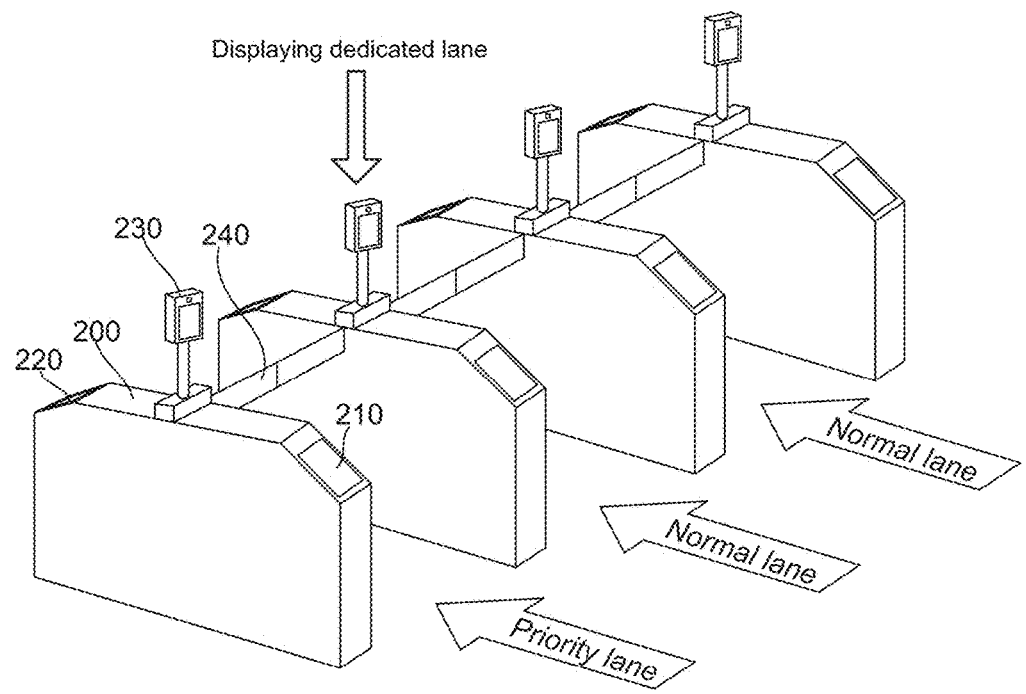
FIG. 15 is a perspective view showing an exemplary gate apparatus in which a dedicated gate is set.

Next, a specific usage example of the attribute information in the authentication system 10 of the seventh embodiment will be described referring to FIGS. 14 and 15. FIG. 14 is a diagram showing a display example by the authentication system of the seventh embodiment. FIG. 15 is a perspective view showing an exemplary gate apparatus in which a dedicated gate is set. The display example of FIG. 14 is displayed on the display of the imaging display apparatus 230, for example. In the following, an example, in which the attribute information includes "status rank of an airline (i.e., status rank, which is determined by an airline used by a target person, of the target person)" and "rank of boarding seat", will be described.

An airline may grant special status to passengers, depending on, for example, past boarding records. A passenger given the status, for example, is called an elite member, and can receive special service in utilizing a flight of the airline. There is a rank in the status of the airline, and the higher the rank, the higher the quality of service can be received. Also, regardless of the status of the airline, the same service may be received depending on a class of a seat of airplane used by a passenger. For example, first-class or business-class passengers may be received services different from economy-class passengers.

For example, elite members, and first-class and business-class passengers can use preferential boarding when boarding an airplane (specifically, they can board earlier timing than normal passengers). For priority boarding, priorities may be determined according to the rank. For example, an elite member, whose rank is the highest, can board an airplane at the earliest timing, but an elite member, whose rank is lower, may board after elite members, whose rank is higher, have boarded. Similarly, first-class passengers can board an airplane at the earliest timing, but business-class passengers may board after first-class passengers have boarded.

When priority boarding as described above is implemented, passengers are determined able to pass through the gate or unable to pass through the gate depending on the status and the rank of a seat. The authentication system 10 of the seventh embodiment may perform a determination of passing through the gate according to the above mentioned rank (i.e., the attribute information) in addition to the determination of passing through the gate on the basis of the number of successful of the face authentication.

As shown in FIG. 14(*a*), when the priority boarding is implemented, it may be displayed that a passenger cannot pass through the gate along with the reason if the attribute information of the target person 500 does not include information relating to the status and the rank of a seat (in other words, the target person does not have qualification for the priority boarding), or if the attribute information of the target person 500 indicates that the rank of the status is low (i.e., if the target person cannot board by using the priority boarding at the present time). Specifically, as shown in the figure, the text "You cannot use priority boarding. Please board after priority boarding" may be displayed.

Elite members, and first-class and business-class passengers may use priority lanes in boarding an airplane, other than the priority boarding described above. Since passengers, who can use priority lanes, are limited, priority lanes are often relatively empty. Therefore, it may be possible to board without waiting time by using priority lanes, even if there is a long line in normal lanes. Qualifications for priority lanes may be set according to a rank, similarly to the priority boarding. For example, there is a priority lane, in which anyone of elite members can use, and a priority lane, in which only elite members, whose rank is the highest, can use. Similarly, there is a priority lane, in which first-class and business-class passengers can use, and a priority lane, in which only first-class passengers can use (i.e., business-class passenger cannot use).

When priority lanes described above are installed, passengers are determined able to pass through the gate, or unable to pass through the gate, according to the status and the rank of a seat. The authentication system 10 of the seventh embodiment may perform a determination of passing through the gate according to the rank described above, in addition to the determination of passing through the gate on the basis of the number of successful of the face authentication.

As shown in FIG. 14(*b*), it may be displayed that a passenger cannot pass through the gate along with the reason if the attribute information (i.e., the status or the rank of a seat) of the target person 500 does not satisfy the qualification of the gate in the priority lane. Specifically, as shown in the figure, the text "You cannot use this gate. Please use other gate" may be displayed.

As shown in FIG. 15, it is suppose that the most front side lane among the three lanes is set as the priority lane, and other lanes are set as the normal lane (a staff or the like can arbitrarily set the priority lane and the normal lane). In this case, any passengers can use two normal lanes. On the other hand, only passengers having a predetermined attribute (e.g., elite members or upper-class passengers) can use the priority lane. When the priority lane is set, information indicating that the lane is the priority lane may be displayed on the display of the imaging display unit 230 corresponding to the priority lane. Further, information relating to the attribute, which can use the priority lane, may be displayed on the display of the imaging display unit 230 corresponding to the priority lane. Furthermore, information indicating that the lane is the normal lane may be displayed on the display of the imaging display unit 230 corresponding to the normal lane. Furthermore, information indicating that all users can use may be displayed on the display of the imaging display unit 230 corresponding to the normal lane. Further, information relating to the priority lane or the normal lane may be displayed other than the display of the imaging display unit 230. The information may be displayed by projecting the information on the floor following each gate.

In addition, for elite members, and first-class and business-class passengers, conditions relating to the face authentication in the determining unit 130 may be relaxed. For example, elite members, and first-class and business-class passengers may be determined able to pass through the gate with the number of successful, which is less than the number of successful of normal passengers. The predetermined number of times used for the determination of passing through the gate may be changed according to the state and the rank of a seat. The predetermined number of times may also be changed stepwise, according to the status and the rank of a seat.

(Other Usage Examples)

When the attribute information of the target person 500 includes information on flight name, it is possible to limit information of registered persons, that are collated in the face authentication unit 120, to only passenger of the flight. Alternatively, when the attribute information of the target person 500 includes information on the airline, which the target person uses, it is possible to limit information of registered persons, that are collated in the face authentication unit 120, to only passenger of flights of the airline. Alternatively, when the attribution information of the target person 500 includes information on the departure time of an airplane, it is possible to limit information of registered persons, that are collated in the face authentication unit 120, to only passenger of flights departing in that time zone. As described above, if it is possible to reduce the number of collations in the face authentication, it is possible to effectively increase the accuracy of the face authentication.

(Technical Effects)

Next, technical effects obtained by the authentication system 10 of the seventh embodiment will be described.

As described referring to FIGS. 12 to 15, in the authentication system 10 of the seventh embodiment, the attribute information of the target person 500 is used in determining that whether or not the target person can pass through the gate. In this way, it is possible to more appropriately determine that whether or not the target person can pass through the gate in comparison with a case, in which the number of successful of the face authentication is only considered.

Eighth Embodiment

The authentication system 10 of the eighth embodiment will be described referring to FIGS. 16 to 20. Incidentally, the eighth embodiment is different from respective embodiments described above in portions of the configuration and the operation. The hardware configuration and the gate configuration may be the same as embodiments already described. Therefore, in the following, portions, that differ from portions already described, will be described in detail, it is intended to omit the description as appropriate for other overlapping portions.

(Functional Configuration)

Figure 16:
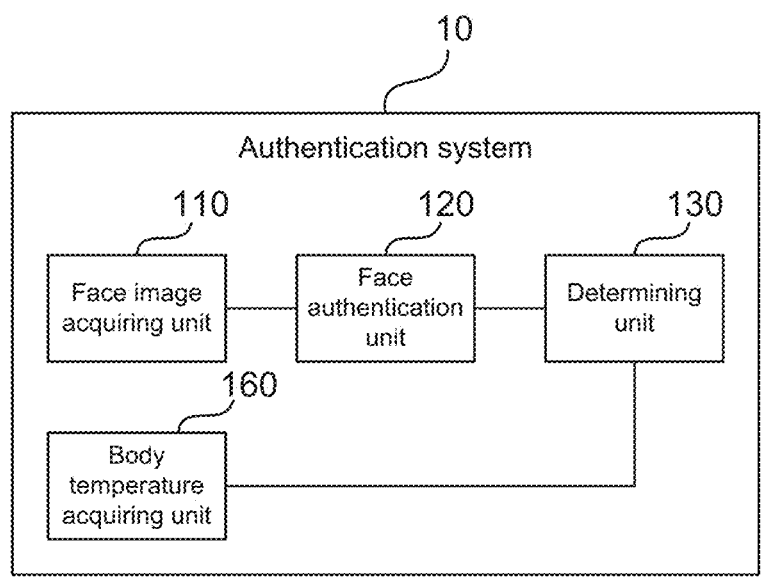
FIG. 16 is a block diagram showing a functional configuration of an authentication system of an eighth embodiment.

First, a functional configuration of the authentication system 10 of the eighth embodiment will be described referring to FIG. 16. FIG. 16 is a block diagram showing the functional configuration of the authentication system according to the eighth embodiment. In FIG. 16, the same reference numeral is given to element, which is the same as the component shown in FIGS. 2, 6 and 12.

As shown in FIG. 16, the authentication system 10 of the eighth embodiment comprises the face image acquiring unit 110, the face authentication unit 120, the determining unit 130 and the body temperature acquiring unit 160 as processing blocks or as physical processing circuits for realizing the function. In other words, the authentication system 10 of the eighth embodiment is configured to further comprising the body temperature acquiring unit 160 in addition to components of the first embodiment (see FIG. 2). The body temperature acquiring unit 160 may be implemented by the processor 11 described above, for example (see FIG. 1).

The body temperature acquiring unit 160 is configured to be able to acquire information on the body temperature of the target person 500 passing through the gate (hereinafter, appropriately referred to as "body temperature information"). The body temperature may be, for example, a surface temperature of a target person. The body temperature information may be information indicating a specific body temperature (i.e., numerical value), or information indicating that it is higher or lower than a normal body temperature.

The body temperature acquiring unit 160 may acquire the body temperature information from, a thermography camera, for example. In this case, the body temperature acquiring unit 160 may acquire the body temperature information a plurality of times in accordance with the timing at which the face image acquiring unit 110 acquires the face image of the target person 500. When the body temperature information is acquired a plurality of times, the body temperature acquiring unit 160 may acquire the body temperature from parts, that are different from each other. For example, the body temperature acquiring unit 160 may acquire the body temperature information by obtaining a temperature of a tear gland at the first time, by obtaining a temperature of a head of a nose at the second time, and by obtaining a temperature of a forehead at the third time. The system is configured to output the body temperature information acquired by the body temperature acquiring unit 160 to the determining unit 130.

(Flow of Operation)

Figure 17:
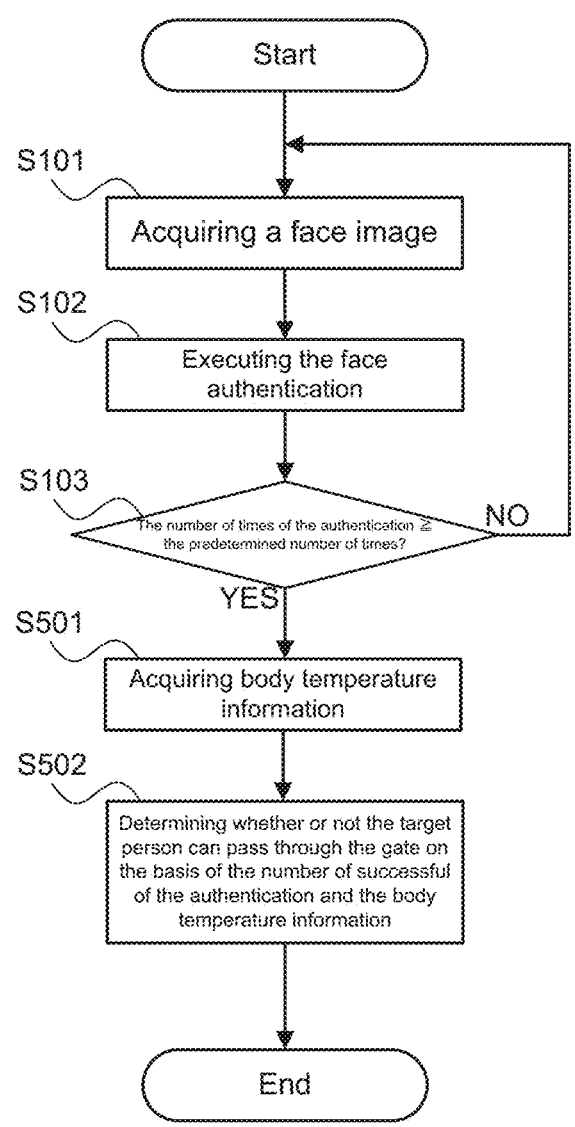
FIG. 17 is a flowchart showing flow of an operation of the authentication system of the eighth embodiment.

Next, a flow of the operation of the authentication system 10 of the eighth embodiment will be described referring to FIG. 17. FIG. 17 is a flowchart showing the flow of the operation of the authentication system of the eighth embodiment. Incidentally, in FIG. 17, the same reference numeral is given to processing, which is the same as processing shown in FIGS. 4, 5, 7 and 13.

As shown in FIG. 17, when the authentication system 10 of the eighth embodiment operates, first, the face image acquiring unit 110 acquires the face image of the target person passing through the gate (step S101). Then, the face authentication unit 120 executes the face authentication by using the information obtained from the face image of the target person (step S102).

Subsequently, the authentication system 10 determines that whether or not the number of the face authentication executed by the face authentication unit 120 is equal to or greater than the predetermined value (step S103). When it is determined that the number of the face authentication executed by the face authentication unit 120 is not equal to and greater than the predetermined value (step S103: NO), processing is repeated from the step S101.

On the other hand, when it is determined that the number of the face authentication executed by the face authentication unit 120 is equal to or greater than the predetermined value (step S103: YES), the body temperature acquiring unit 160 acquires the body temperature information of target person 500 (step S501). Incidentally, the body temperature acquiring unit 160 may acquire the body temperature information in parallel with processing of the step S101 to the step S103 described above.

Thereafter, the determining unit 130 determines that whether or not the target person 500 can pass through the gate on the basis of the number of successful of the face authentication executed by the face authentication unit 120 and the body temperature information of the target person 500 (step S502). For example, the determining unit 130 may determine that the target person 500 can pass through the gate when a condition relating to the body temperature information in addition to the condition relating to the number of successful of the face authentication are satisfied. The determining unit 130 may determine that the target person 500 cannot pass through the gate when the condition relating to the number of successful of the face authentication or the condition relating to the body temperature information is not satisfied.

The condition relating to the body temperature information may be set in consideration of possibility of the target person being infected by an infectious disease, for example. It may be determined that possibility of the target person being infected by an infectious disease is low, and that the target person can pass through the gate if the body temperature of the target person 500 is the normal temperature, for example. On the other hand, it may be determined that possibility of the target person being infected by an infectious disease is high, and that the target person cannot pass through the gate if the body temperature of the target person 500 is higher than the normal temperature. In addition, when body temperatures of a plurality of locations of the target person (e.g., a tear gland, a forehead, etc.) are acquired, it may be determined that the target person cannot pass through the gate if the body temperature of any one of the plurality of locations is higher than the normal temperature. It may be determined that whether or not the target person can pass through the gate by comprehensively considering body temperatures of the plurality of locations. For example, it may be calculated an average value of body temperatures obtained from the plurality of locations. Further, it may be calculated an index of body temperature by giving a high weight to the body temperature obtained from the tear gland, and by giving a low weight to the body temperature obtained from the forehead.

(Specific Determining Processing)

Figure 18:
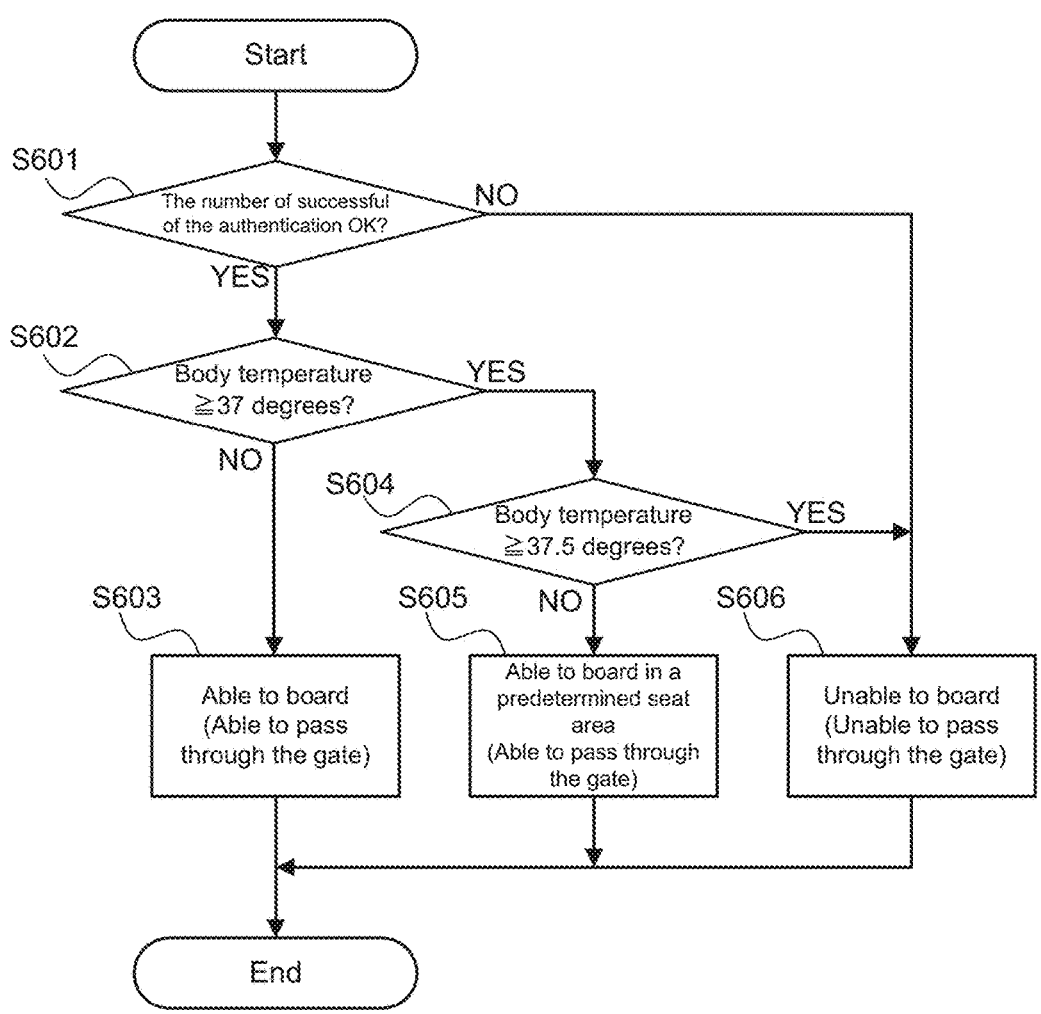
FIG. 18 is a flowchart showing flow of a determining processing of the authentication system of the eighth embodiment.

Next, a flow of the determining processing of the authentication system 10 of the eighth embodiment referring to FIG. 18. FIG. 18 is the flowchart showing the flow of the determining processing of the authentication system of the eighth embodiment. Incidentally, each processing shown in FIG. 18 is a processing executed in the step S502 of FIG. 17.

As shown in FIG. 18, in the determining processing of the authentication system 10 of the eighth embodiment, first, the determining unit 130 determines that whether or not the condition relating to the number of successful of the face authentication is satisfied (step S601). For example, the determining unit 130 determines that whether or not the number of successful of the face authentication is equal to or greater than a predetermined number of times.

When the condition relating to the number of successful of the face authentication is satisfied (step S601: YES), the determining unit 130 determines that whether or not the body temperature of the target person 500 is equal to or higher than 37 degrees by using the body temperature information acquired by the body temperature acquiring unit 160 (step S602). When it is determined that the body temperature of the target person 500 is not equal to and higher than 37 degrees (step S602: NO), the determining unit 130 determines that the target person 500 can board (i.e., can pass through the gate) (step S603).

On the other hand, when it is determined that the body temperature of the target person 500 is equal to or higher than 37 degrees (step S602: YES), the determining unit 130 determines that whether or not the body temperature of the target person 500 is equal to or higher than 37.5 degrees by using the body temperature information acquired by the body temperature acquiring unit 160 (step S604). When it is determined that the body temperature of the target person 500 is not equal to and higher than 37.5 degrees (step S604: NO), although the target person 500 can board (i.e., can pass through the gate), the determining unit 130 determines that the seat should be changed to a predetermined seating area because the target person is likely to be infected by an infectious disease (step S605).

The "predetermined seating area" here is, for example, an area located at the forefront or the rearmost of an airplane, where passengers, that are likely to be infected by an infectious disease, are gotten together. For example, vinyl sheets, partitions, or the like may be installed in the predetermined seat area in order to prevent splash infection. Incidentally, when the target person 500 moves to the predetermined seat area, his/her traveling companion (e.g., family, etc.) is also preferably moved to the predetermined seat area. When the target person 500 is infected by an infectious disease, the traveling companion is also likely to be infected by the infection disease.

When it is determined that the body temperature of the target person 500 is equal to or higher than 37.5 degrees (step S604: YES), the determining unit 130 determines that the target person cannot board (i.e., cannot pass through the gate) because the target person 500 is likely to be developing an infection disease (step S606). Incidentally, when the condition relating to the number of successful of the face authentication is not satisfied (step S601: NO), the determining unit 130 determines that the target person 500 cannot board (i.e., cannot pass through the gate) (step S606).

As described above, in the determining processing by using the body temperature information, a plurality of thresholds for the body temperature are set, it may be performed different responses according to the body temperature. Incidentally, the above-described thresholds (i.e., 37 degrees, and 37.5 degrees) are merely examples, and can be appropriately set. Further, it may be set three or more thresholds with respect to the body temperature.

(Display Examples)

Figure 19:
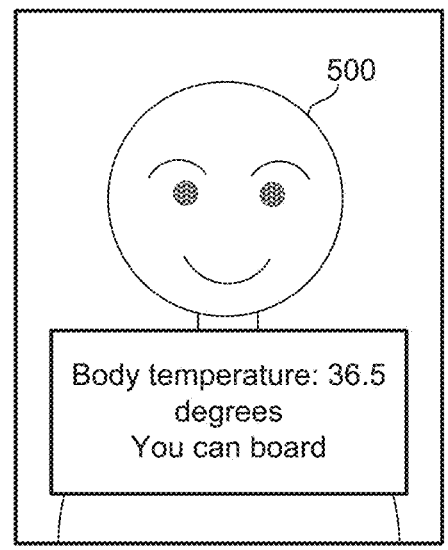
FIG. 19 is a diagram (part 1) showing a display example by the authentication system of the eighth embodiment.
Figure 19:
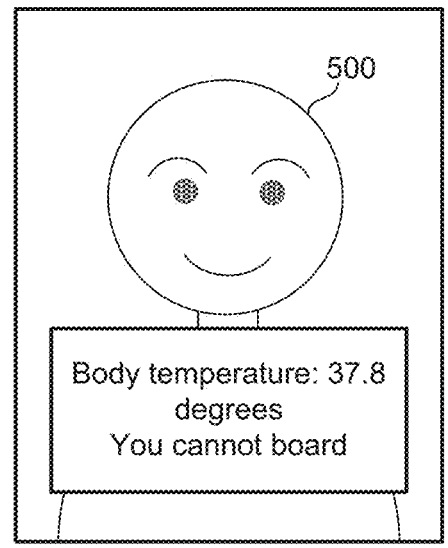
Figure 20:
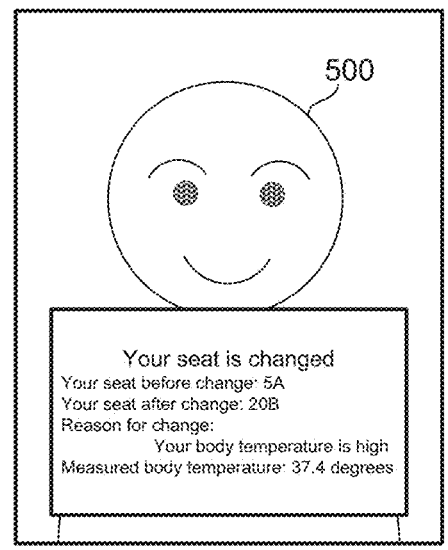
FIG. 20 is a diagram (part 2) showing a display example by the authentication system of the eighth embodiment.
Figure 20:
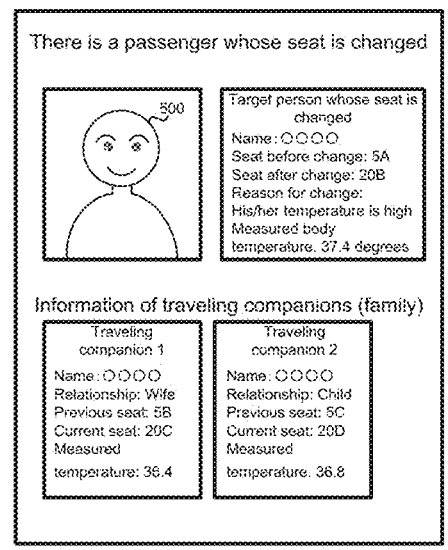

Next, display examples of the body temperature information in the authentication system 10 of the eighth embodiment will be described referring to FIGS. 19 and 20. FIG. 19 is a diagram (part 1) showing a display example by the authentication system of the eighth embodiment. FIG. 20 is a diagram (part 2) showing a display example by the authentication system of the eighth embodiment. Display examples of FIGS. 19 and 20 are displayed on the display of the imaging display apparatus 230 or the display 220 for attendants, for example.

As shown in FIG. 19, in the authentication system 10 of the eighth embodiment, the body temperature information and information indicating whether or not the target person can pass through the gate may be displayed in addition to the face images of the target person 500 used for the face authentication. For example, as shown in FIG. 19(*a*), when the body temperature of the target person 500 is normal temperature (36.5 degrees), the text "You can bord" is displayed along with the body temperature. In other words, since the target person is likely to be not infected by an infection disease, information, which indicates the target person can pass through the gate, is displayed. Further, as shown in FIG. 19(*b*), when the body temperature of the target person 500 is high temperature (37.8 degrees), the text "You cannot bord" is displayed along with the body temperature. In other words, since the target person is likely to be infected by an infection disease, information, which indicates the target person cannot pass through the gate, is displayed.

Display examples shown in FIG. 19 may be displayed in combination with, for example, display examples described in the sixth embodiment (see FIGS. 10 and 11). In other words, in addition to the body temperature information, the number of the face authentication currently executed, the number of successful of the face authentication, the result of the determination that whether or not the target person can pass through the gate on the basis of the face authentication, or the like may be displayed.

As shown in FIG. 20, in the authentication system 10 of the eighth embodiment, when the seat is changed due to the body temperature of target person 500 (i.e., when the step S605 of FIG. 18), various information on the seat change may be displayed. For example, as shown in FIG. 20(*a*), information, which indicates the seat of the target person is changed, may be displayed on the display of the imaging display unit 230. In this case, followings may be displayed: the seat before the change, the seat after the change, the reason for the seat change, the measured body temperature, or the like. Further, as shown in FIG. 20(*b*), information for staffs, which indicates there is a passenger whose seat is changed, may be displayed on the display 220 for attendants. In this instance, the face image of the target person 500, whose seat is changed, and various information on the target person 500 (e.g., name, the seat before the change, the seat after the change, the reason for the seat change, the measured body temperature, etc.) may be displayed. In addition, when there is a traveling companion of the target person 500, whose seat is changed, various information on the traveling companion (e.g., name, the relationship with the target person 500, whose seat is changed, the seat before the change, the seat after the change, the measured body temperature, etc.) may be displayed.

(Other Usage Examples)

The body temperature information of the target person 500 can also be used for live-ness determination (i.e., biometric determination). Specifically, if the body temperature indicated by the body temperature information obtained from the target person 500 is a temperature close to the normal temperature, it is possible to determine that the imaged target person 500 is a living body. On the other hand, if the body temperature indicated by the body temperature information obtained from the target person 500 is low, it is possible to determine that the imaged target person is not a living body (e.g., a photograph or the like).

A thermography used for obtaining the body temperature information can also be used for determining the distance to the target person 500. For example, the application range of a thermography is set relatively short distance (e.g., 1 m), it is possible to detect the target person 500 moving toward the gate. More specifically, when there are persons in the imaging range, it is possible to determine that whether or not who is the target person 500, who should be determined that whether or not the target person can pass through the gate. If it is possible to detect the target person 500 in this way, it can also be used to control the timing of imaging the face image of the target person 500. Incidentally, it is possible to determine the distance to the target person by associating with various devices such as an analysis result of a camera, information of a proximity sensor, in addition to a thermography.

In the determining processing by using the body temperature information (see FIG. 18), the attribute information described in the seventh embodiment can also be used in addition to body temperature information. For example, the threshold for the body temperature may be changed according to the attribute information. For example, seats that rank are high, such as first-class or business-class, have a wider interval between passengers in comparison with economy-class.

For this reason, the possibility that an infectious disease spreads to passengers is low. Therefore, for passengers, that rank of a seat is high, the threshold of the body temperature for determining that a passenger cannot board may be changed to a higher value.

(Technical Effects)

Next, technical effects obtained by the authentication system 10 of the eighth embodiment will be described.

As described referring to FIGS. 16 to 20, in the authentication system 10 of the eighth embodiment, the body temperature information of the target person 500 is used in determining that whether or not the target person can pass through the gate. In this way, it is possible to more appropriately determine that whether or not the target person can pass through the gate in comparison with a case, in which the number of successful of the face authentication is only considered.

Supplementary Note

With respect to embodiments described above, it may be further described as supplementary notes below, but is not limited to the following.

(Supplementary Note 1)

An authentication system according to supplementary note 1 is an authentication system comprising: an acquiring means for acquiring a face image of a target passing a gate; a face authentication means for performing a face authentication, in which it is determined that whether or not the target is a registered target, by collating information obtained from the face image of the target with information about faces of a plurality of registered targets; and a determining means for determining whether or not the target can pass through the gate on the basis of a number of times of successful authentication when the face authentication is performed a plurality of times.

(Supplementary Note 2)

An authentication system according to supplementary note 2 is the authentication system according to supplementary note 1, wherein the determining means determines that the target can pass through the gate at least one of a case in which the number of successful authentication is equal to or greater than a predetermined number of times, and in which the face authentication succeeds continuously for a predetermined number of times or more.

(Supplementary Note 3)

An authentication system according to supplementary note 3 is the authentication system according to supplementary note 1 or 2, further comprising a storage means for storing a plurality of face images of the target, wherein the face authentication means perform the face authentication by selecting a face image, which is suitable for the face authentication, from the plurality of face images of the target stored in the storage means.

(Supplementary Note 4)

An authentication system according to supplementary note 4 is the authentication system according to any one of supplementary notes 1 to 3, wherein the acquiring means acquires a plurality of face images, each of which is imaged from different angle each other by changing at least one or more of a position, a height and an angle of a camera for imaging a face of the target.

(Supplementary Note 5)

An authentication system according to supplementary note 5 is the authentication system according to any one of supplementary notes 1 to 4, wherein the face authentication means performs face authentication by using a face image of the target imaged from a first direction, and face authentication by using a face image of the target imaged from a second direction, which is different from the first direction.

(Supplementary Note 6)

An authentication system according to supplementary note 6 is the authentication system according to any one of supplementary notes 1 to 5, further comprising a display means for displaying at least one or more of information about a number of times of performance of the face authentication, information about a number of times of successful authentication of the face authentication, and information about whether or not the target can pass through the gate.

(Supplementary Note 7)

An authentication system according to supplementary note 7 is the authentication system according to any one of supplementary notes 1 to 6, further comprising an attribute acquiring means for acquiring information about an attribute of the target, wherein the determining means determines whether or not the target can pass through the gate on the basis of a number of times of successful authentication when the face authentication is performed a plurality of times, and the information about the attribute.

(Supplementary Note 8)

An authentication system according to supplementary note 8 is the authentication system according to any one of supplementary notes 1 to 7, further comprising a body temperature acquiring means for acquiring information about body temperature of the target, wherein the determining means determines whether or not the target can pass through the gate on the basis of a number of successful authentication when the face authentication is performed a plurality of times, and the information about the body temperature.

(Supplementary Note 9)

An authentication apparatus according to supplementary note 9 is an authentication apparatus comprising: an acquiring means for acquiring a face image of a target passing a gate; a face authentication means for performing a face authentication, in which it is determined that whether or not the target is a registered target by collating information obtained from the face image of the target with information about faces of a plurality of registered targets; and a determining means for determining whether or not the target can pass through the gate on the basis of a number of times of successful authentication when the face authentication is performed a plurality of times.

(Supplementary Note 10)

An authentication method according to supplementary note 10 is an authentication method comprising: acquiring a face image of a target passing a gate; performing a face authentication, in which it is determined that whether or not the target is a registered target, by collating information obtained from the face image of the target with information about faces of a plurality of registered targets; and determining whether or not the target can pass through the gate on the basis of a number of times of successful authentication when the face authentication is performed a plurality of times.

(Supplementary Note 11)

A computer program according to supplementary note 11 is a computer program for causing a computer to: acquiring a face image of a target passing a gate; performing a face authentication, in which it is determined that whether or not the target is a registered target, by collating information obtained from the face image of the target with information about faces of a plurality of registered targets; and determining whether or not the target can pass through the gate on the basis of a number of times of successful authentication when the face authentication is performed a plurality of times.

(Supplementary Note 12)

A recording medium according to supplementary note 12 is a recording medium, wherein the computer program according to supplementary note 11 is recorded.

This disclosure can be changed as appropriate in range not contrary to range of claims and the inventive summary or philosophy which can be read from the entire specification. Authentication systems, authentication apparatuses, authentication methods and computer programs with such modifications are also included in the technical philosophy of this disclosure.

DESCRIPTION OF REFERENCE NUMERALS AND LETTERS

10 Authentication system
11 Processor
110 Face image acquiring unit
120 Face authentication unit
130 Determining unit
140 Face image storage unit
150 Attribute acquiring unit
160 Body temperature acquiring unit
200 Gate apparatus
210 Reading unit
220 Display for attendants
230 Imaging display apparatus
240 Open/close bar
500 Target person

What is claimed is:

1. An authentication system comprising:
at least one memory storing instructions; and
at least one processor configured to execute the instructions to:
acquire a face image of a target passing a gate;
acquire attribute information including at least one of personal information belonging to the target and information related to boarding;
perform a face authentication, in which whether or not the target is a registered target is determined, by collating information obtained from the face image of the target with information about a plurality of faces of a respective plurality of registered targets; and determine whether or not the target is permitted to pass through the gate based on whether or not a number of times of that the face authentication was successful, when the face authentication has been performed a plurality of times, is equal to or greater than a threshold value that is set based on the attribute information of the target.

2. The authentication system according to claim 1, wherein the at least one processor is configured to execute the instructions to determine that the target is permitted to pass through the gate in at least one of a case in which the number of times of that the face authentication was successful is equal to or greater than a predetermined number of times, and a case in which the face authentication has succeeded continuously for the predetermined number of times or more.

3. The authentication system according to claim 2, wherein the at least one processor is configured to execute the instructions to:
store a plurality of face images of the target; and
perform the face authentication by selecting a face image suitable for the face authentication, from the plurality of face images of the target stored.

4. The authentication system according to claim 2, wherein the at least one processor is configured to execute the instructions to acquire a plurality of face images that are imaged from different angles by changing at least one or more of a position, a height, and an angle of a camera for imaging a face of the target.

5. The authentication system according to claim 2, wherein the at least one processor is configured to execute the instructions to perform face authentication by using a first face image of the target imaged from a first direction, and face authentication by using a second face image of the target imaged from a second direction different from the first direction.

6. The authentication system according to claim 2, wherein the at least one processor is configured to execute the instructions to display at least one or more of information about a number of the plurality of times the face authentication has been performed, information about the number of times that the face authentication was successful, and information about whether or not the target is permitted to pass through the gate.

7. The authentication system according to claim 1, wherein the at least one processor is configured to execute the instructions to:
store a plurality of face images of the target; and
perform the face authentication by selecting a face image suitable for the face authentication, from the plurality of face images of the target stored.

8. The authentication system according to claim 7, wherein the at least one processor is configured to execute the instructions to acquire a plurality of face images that are imaged from different angles by changing at least one or more of a position, a height, and an angle of a camera for imaging a face of the target.

9. The authentication system according to claim 7, wherein the at least one processor is configured to execute the instructions to perform face authentication by using a first face image of the target imaged from a first direction, and face authentication by using a second face image of the target imaged from a second direction different from the first direction.

10. The authentication system according to claim 7, wherein the at least one processor is configured to execute the instructions to display at least one or more of information about a number of the plurality of times the face authentication has been performed, information about the number of times that the face authentication was successful, and information about whether or not the target is permitted to pass through the gate.

11. The authentication system according to claim 1, wherein the at least one processor is configured to execute the instructions to acquire a plurality of face images that are imaged from different angles by changing at least one or more of a position, a height, and an angle of a camera for imaging a face of the target.

12. The authentication system according to claim 11, wherein the at least one processor is configured to execute the instructions to perform face authentication by using a first face image of the target imaged from a first direction, and face authentication by using a second face image of the target imaged from a second direction different from the first direction.

13. The authentication system according to claim 11, wherein the at least one processor is configured to execute the instructions to display at least one or more of information about a number of the plurality of times the face authentication has been performed, information about the number of times that the face authentication was successful, and information about whether or not the target is permitted to pass through the gate.

14. The authentication system according to claim 1, wherein the at least one processor is configured to execute the instructions to perform face authentication by using a first face image of the target imaged from a first direction, and face authentication by using a second face image of the target imaged from a second direction different from the first direction.

15. The authentication system according to claim 14, wherein the at least one processor is configured to execute the instructions to display at least one or more of information about a number of the plurality of times the face authentication has been performed, information about the number of times that the face authentication was successful, and information about whether or not the target is permitted to pass through the gate.

16. The authentication system according to claim 1, wherein the at least one processor is configured to execute the instructions to display at least one or more of information about a number of the plurality of times the face authentication has been performed, information about the number of times that the face authentication was successful, and information about whether or not the target is permitted to pass through the gate.

17. The authentication system according to claim 1, wherein the at least one processor is configured to execute the instructions to:
acquire information about body temperature of the target, and
determine whether or not the target is permitted to pass through the gate based on the number of times that the face authentication was successful authentication, when the face authentication has been performed the plurality of times, and the information about the body temperature.

18. An authentication method performed by a computer and comprising:
acquiring a face image of a target passing a gate;
acquiring attribute information including at least one of personal information belonging to the target and information related to boarding;

performing a face authentication, in which whether or not the target is a registered target is determined, by collating information obtained from the face image of the target with information about a plurality of faces of a respective plurality of registered targets; and determining whether or not the target is permitted to pass through the gate based on whether or not a number of times of that the face authentication was successful, when the face authentication has been performed a plurality of times, is equal to or greater than a threshold value that is set based on the attribute information of the target.

19. A non-transitory recording medium storing a computer program executable by a computer to perform processing comprising:

acquiring a face image of a target passing a gate;

acquiring attribute information including at least one of personal information belonging to the target and information related to boarding;

performing a face authentication, in which whether or not the target is a registered target is determined, by collating information obtained from the face image of the target with information about a plurality of faces of a respective plurality of registered targets; and determining whether or not the target is permitted to pass through the gate based on whether or not a number of times of that the face authentication was successful, when the face authentication has been performed a plurality of times, is equal to or greater than a threshold value that is set based on the attribute information of the target.

* * * * *